Aug. 18, 1970 A. E. PINET ET AL 3,524,946

MULTIREGISTER FOR TIME DIVISION TELEPHONE SWITCHING SYSTEMS

Filed Aug. 1, 1966 9 Sheets-Sheet 1

INVENTORS

ANDRE PINET, JEAN-BAPTISTE JACOB & ERNEST ESCLANGON

INVENTORS
ANDRE PINET, JEAN-BAPTISTE
JACOB & ERNEST ESCLANGON

INVENTORS
ANDRE PINET, JEAN-BAPTISTE
JACOB & ERNEST ESCLANGON

INVENTORS
ANDRE PINET, JEAN-BAPTISTE
JACOB & ERNEST ESCLANGON

INVENTORS
ANDRE PINET, JEAN-BAPTISTE JACOB & ERNEST ESCLANGON

INVENTORS

ANDRE PINET, JEAN-BAPTISTE
JACOB & ERNEST ESCLANGON

INVENTORS
ANDRE PINET, JEAN-BAPTISTE
JACOB & ERNEST ESCLANGON

INVENTORS
ANDRE PINET, JEAN-BAPTISTE
JACOB & ERNEST ESCLANGON

Aug. 18, 1970 A. E. PINET ET AL 3,524,946

MULTIREGISTER FOR TIME DIVISION TELEPHONE SWITCHING SYSTEMS

Filed Aug. 1, 1966 9 Sheets-Sheet 9

INVENTORS

ANDRE PINET, JEAN-BAPTISTE JACOB & ERNEST ESCLANGON

United States Patent Office 3,524,946
Patented Aug. 18, 1970

3,524,946
MULTIREGISTER FOR TIME DIVISION TELEPHONE SWITCHING SYSTEMS

André E. Pinet, 22 Rue Emile Le Gac, and Jean-Baptiste Jacob, 4 Rue des Freres Lumiere, both of Perros-Guirec, and Ernest P. Esclangon, Le Clapotis, Ploumanach, France Filed Aug. 1, 1966, Ser. No. 569,142
Claims priority, application France, July 30, 1965, 26,706
Int. Cl. H04j 3/04; H04m 3/54
U.S. Cl. 179—18 4 Claims

ABSTRACT OF THE DISCLOSURE

Pulse code modulated time division switching system comprising subscribers' line modem sets for sampling the analog telephone signals and converting the resulting samples into PCM signals, a crosspoint matrix, send-and-receive group highways respectively issuing from and entering into said modem sets and intermediate highways for selectively connecting the send-and-receive group highways. A computer is provided for searching and calling subscribers' lines, selecting idle intermediate highways and selectively activating the crosspoint matrix. A multiregister is provided for detecting the signals in the highways, receiving the dialled digits, sending on the lines adequate tones, identifying the calling and called subscribers' lines and processing the establishment and release of communications. The multiregister is principally formed of a circulated store divided into two synchronous circulating stores, one for the data and the other for addresses, connected to (i) registers and circuits for searching and marking the modem sets and the intermediate highways and detecting and checking the dialled digits and to (ii) the computer by a "from computer to multiregister" circulating store and a "from multiregister to computer" circulating store, said two last circulating stores being also divided into two synchronous circulating stores, one for data and the other for addresses.

The invention relates to a time division telephone switching system including a multiregister and a central computer, each performing specific functions necessary to the establishment or clearing of a connection.

Pulse code modulated (PCM) time division telephone switching systems are known, more particularly from U.S. Pat. 2,957,949 of Oct. 25, 1960 entitled "PCM Time Division Switching System," wherein speech signals are sampled cyclically and the amplitude of each of the pulses arising from sampling is expressed in a, for instance, 8-bit code and transmitted, in a time slot specific to each call of the sampling cycle, via send-and-receive group highways which are briefly interconnected by intermediate highways and switchable crosspoints. Operation of such switching systems is complicated by the need to supervise the resulting time channels on the network lines during connect and disconnect times, this supervision requiring storage means comprising in combination delay lines and shift registers, the control of which overloads the program of the central computer of the switching system.

In the switching system of the invention, the central computer deals with line finding, crosspoint activation and selection of intermediate highways and a multiregister which provide the following functions:

(1) Control of transmission of dialling tone to a local calling subscriber;

(2) Control of cessation of dialling tone upon the start of dialling;

(3) Reception and storage of calling subscribers' dialling;

(4) Transmission to the central computer of the dialled number or of an indication of absent or incomplete dialling or of premature on-hooking of the calling subscriber;

(5) Control of transmission of ringing tone to a local called subscriber;

(6) Control of cessation of ringing tone upon the called subscriber off-hooking;

(7) Indicating start of call to computer, for charging purposes;

(8) Control of transmission of busy tone to a calling subscriber;

(9) Cessation of busy tone upon the calling subscriber on-hooking;

(10) Indication to central computer of the calling subscriber on-hooking or of the absence of on-hooking after a desired time;

(11) Temporary supervision of a subscriber's line, and indication to central computer of the final state of the particular subscriber's loop being supervised, and

(12) Control of transmission of all the indicating and dialling signals to circuits connecting with other telephone exchanges, in order to establish and clear communications between local subscribers and subscribers connected to the other exchanges.

This invention comprises an improvement in a pulse code modulated time division telephone switching system of the type shown in U.S. Pat. No. 3,303,287 wherein a multiregister and a central computer each perform specific functions necessary to the establishment of clearing of a connection. The switching system of the patent comprises subscribers' lines carrying analog signals, subscribers' line modulation and demodulation sets, e.g. modem sets, adapted for sampling and converting said analog signals into PCM signals, a crosspoint matrix including send-and-receive group highways connected to the modem sets and junction lines transmitting time multiplexed signals from the calling subscribers' lines to the called subscribers' lines. The present improvement includes a central computer, a multiregister, and means for transferring addresses and data from the computer to the multiregister and vice-versa. The central computer of the invention comprises means for searching the calling subscribers' lines, means for selecting idle intermediate highways and means for selectively activating the crosspoint matrix. The multiregister of the invention comprises means for detecting the signals in the intermediate highways and for deriving data words therefrom, a data circulating store and an address circulating store, each synchronous with the other, a first and a second write-in circuit and a first and a second read-out circuit inserted in both the data and address circulating stores. The multiregister further includes an adder-subtracter circuit inserted in the data circulating store and means for connecting the detecting and data word deriving means to the second write-in and second read-out circuits in both the data and the circulating stores. The transferring means of the invention comprises an input data transfer circulating store having a write-in circuit connected to the central computer and a read-out circuit connected to the first write-in circuit of the data circulating store, an input address transfer circulating store having a write-in circuit connected to the central computer and a read-out circuit connected to the first write-in circuit of the address circulating store, an output data transfer circulating store having a read-out circuit connected to the central computer and a write-in circuit connected to the first read-out circuit of the data circulating store, and an output address transfer circulating store having a read-out circuit connected to the central computer and a write-in circuit connected to the first read-out circuit of the address circulating store.

The invention will be better understood from a study of the following description and of the accompanying drawings wherein.

Figures 1, 2:
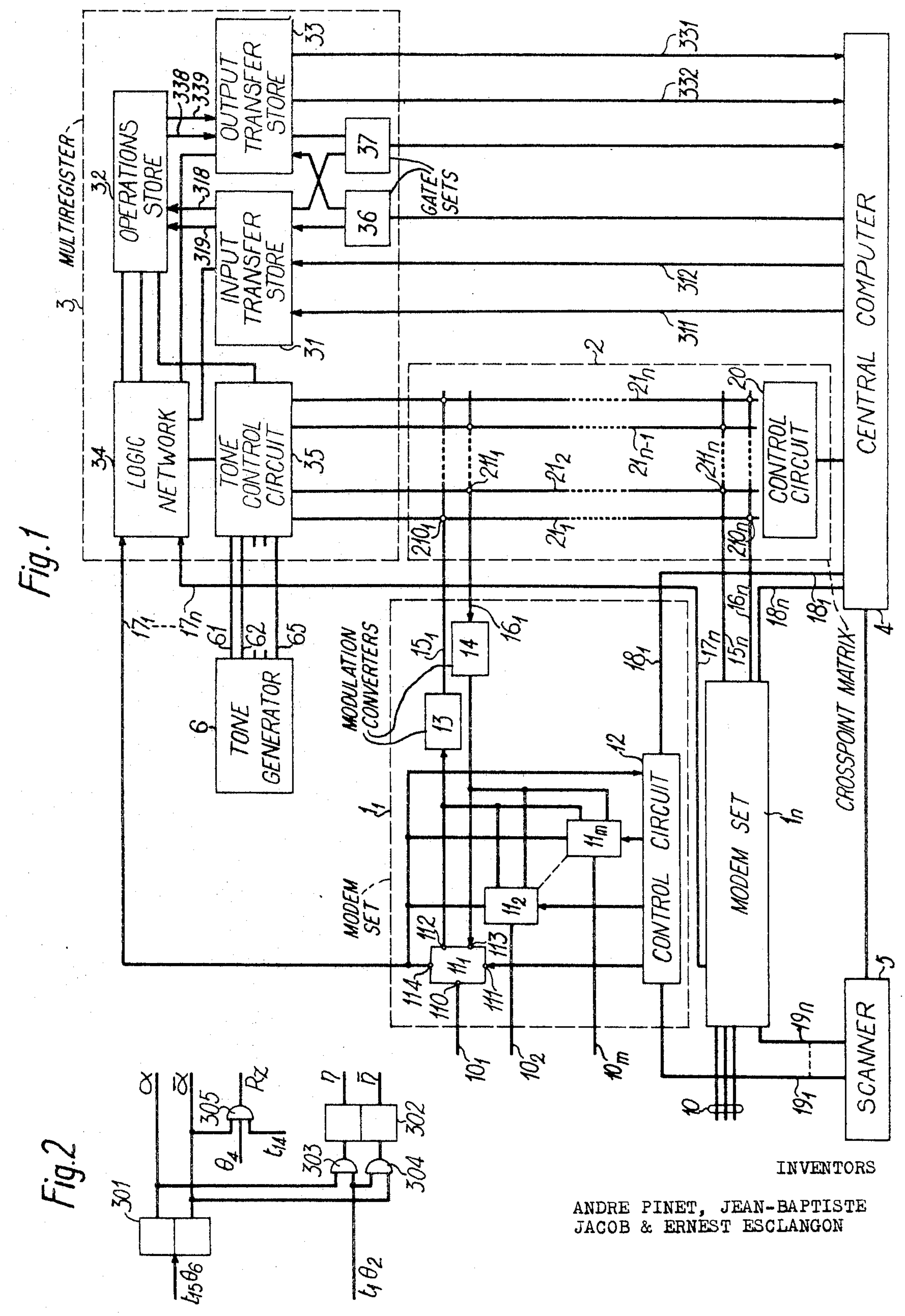
FIG. 1 is a simplified block diagram of a time division switching system together with a central computer and a multiregister embodying the invention.
FIG. 2 is a diagram of one particular logic circuit forming part of the multiregister according to the invention.

FIG. 1 is a block diagram of a multiregister 3 according to the invention associated with a conventional time division switching system. The same comprises in known manner a number of modulation demodulation or modern sets $1_1$ to $1_n$ each serving a desired number of subscribers' lines 10, for instance $10_1$ to $10_m$, and connecting them, via send group highways, as $15_1$, $15_n$, and receive group highways, as $16_1$, $16_n$ to a crosspoint matrix 2 comprising as many intermediate highways grouped in pairs $21_1$, $21_2$ to $21_{n-1}$, $21_n$ as the switching system has modern sets. Each pair of intermediate highways can be connected during predetermined time slots to the send group highway and receive group highway of any single modern set and to the receive group highway, for the first intermediate highway of the pair, and to the send group highway, for the second intermediate highway of the pair, of any single one of the other modern sets, by way of switchable crosspoints controlled by a control circuit 20 dependent upon a central computer 4. For instance, junction line $21_1$ can be connected via switchable crosspoint $210_1$ to send group highway $15_1$ of modern set $1_1$ and via crosspoint $210_n$ to receive group highway $16_n$ of modern set $1_n$, simultaneously as intermediate highway $21_2$ connects send group highway $15_n$ and receive group highway $16_1$ via crosspoints $211_n$ and $211_1$.

All the modern sets $1_1$ to $1_n$ are identical, comprising for each subscriber's line $10_1$ to $10_m$ a modern device $11_1$ to $11_m$, for instance, of the kind disclosed in U.S. Pat. No. 3,303,287 issued Feb. 7, 1967. Each of the modern devices $11_1$ to $11_m$ comprises a terminal 110 connected to the two-wire subscriber's line, as $10_1$, which it serves, a control input terminal 111 to which periodic sampling and test pulses can be applied by a control circuit 12, a sample output terminal 112, a sample input terminal 113 and a test output terminal 114 at which a signal appears indicating the open or closed state of the subscriber's loop in response to any pulse applied to the control input terminal 111. The output terminals 112 of the devices $11_1$ to $11_m$ are connected in parallel to the input of a send modulation converter 13 whose output terminal is connected to the send group highway, for instance, $15_1$ of the particular modern set concerned. Similarly, the input terminals 113 of the devices $11_1$ to $11_m$ are connected in parallel to the output of an receive modulation converter 14 whose input terminal is connected to the receive group highway, for instance, $16_1$. The test response terminals 114 are connected in parallel to an input of the control circuit 12 which is connected to the central computer 4 by a connection, as $18_1$, $18_n$, and, by a connection as $19_1$, $19_n$ to a scanner 5 which scans the subscribers' lines in order to detect the service conditions thereof. Further, a conventional time division switching system of the kind which has been very briefly outlined in the foregoing comprises a generator 6 which provides the usual dialling, ringing, busy and so on tones.

In such a switching system, connecting two subscribers' lines to one another comprises, of course, the recurrent establishment during a given time slot of a connection between the two modern devices associated with the lines concerned, by the simultaneous application of unblocking pulses to such devices and by rendering conductive for the same time the crosspoints which connect the send-and-receive group highways of their respective modern sets via one pair of intermediate highways. In the special case of two subscribers who are connected to the same modern set taking into account that the time slots of the subscribers' lines connected to the same modem must be different, it is necessary to store the signals transmitted to the called subscriber. Via their output 112, the devices, as $11_1$ transmit amplitude-modulated pulses which are samples of the telephonic modulation of the line, as $10_1$, which they serve, the samples resulting from the sampling pulses applied to their control input 111. The modulation converter 13 converts the amplitude-modulated pulses which it receives into either duration-space or position space or binary-code-modulated pulses (PCM) and transmits the resulting constant amplitude pulses to the send group highway $15_1$, and the modulation converter 14 makes a converse conversion of the pulses received from the receive group highway $16_1$ to apply amplitude-modulated pulses to the input 113 of the modem devices $11_1$ to $11_m$, which restore the analog speech signals.

Line finding is performed by the computer 4, and not by the multiregister 3, simultaneously in all the modem sets $1_1$ to $1_n$ under the supervision of the scanner 5 which, during the scanning time slots, indicates to each control circuit, as 12, the number of the modem device $11_1$ to $11_m$ which is to be tested by test pulses. When the test response pulses which respond to these test pulses indicate that the scanned line, for instance, $10_1$ is looped, the control circuit 12 gives an indication of this calling to the central computer 4 via the line $18_1$, and the computer 4 allots to the control circuit 12 one elementary free time slot $t$ of the pair of send-and-receive group highways $15_1$, $16_1$ and communicates it to the control circuit 12. The same then periodically applies sampling pulses to the modem device $11_1$ at each time $t$, while the central computer 4 transmits to control circuits 20 of the crosspoint-matrix 2 the instructions which cause the group highways $15_1$, $16_1$ to be connected as each elementary time interval $t$ to an available pair of intermediate highways, for instance, $21_1$, $21_2$ by the crosspoints $210_1$, $211_1$, so that a connection is established at each time slot $t$ between the subscriber's line $10_1$ and the intermediate highway pair $21_1$, $21_2$.

In conventional time distribution switching systems, the sequence of operation required for trunking is dealt with entirely by the central computer 4.

The multiregister 3 comprises five main parts—an input transfer store 31, an opeartions store 32, an output transfer store 33, a logic network 34, and a tone control circuit 35. The input transfer store 31 and the output transfer store 33 serve as buffer stores between the central computer 4 and the operations store 32.

The central computer 4 (FIG. 3) can transmit to the input transfer store 31 a subscriber's line address via lead 312 and, via lead 311, data on the state of such line and on the operations to be performed, while from the output transfer store 33 the computer 4 can receive a subscriber's line address via lead 332, and via lead 331, a record of the operations performed and of the resulting new situation. Also, via a set of gates 36, the computer 4 can indicate to the input transfer store 31 that it has finished transmitting information to it and to the store 33 that it has finished receiving its last communication, while via a set of gates 37 it can receive an availability signal from the input store 31 and a signal indicating that a complete communication is available to it in the output store 33.

The operations store 32 comprises two circulating store systems which are synchronized with one another and which are allotted the one to addresses and the other to the corresponding data. These circulating store systems comprise consecutive places, called register words, which are allotted temporarily to a particular call whose address and data elements, having been introduced by the computer 4 into the input store 31, are transferred to the first available place of the operations store 32. The register words are read-out as the operations store is passed through and are processed by the logic network 34, as will be explained later, then transferred after completion of their processing program into the output store 33 and thence to the central computer 4.

The logic network 34 is connected to the operations store 32 and to the test response terminals 114 of all the modem devices $11_1$ to $11_m$ of each modem set $1_1$ to $1_n$ via leads $17_1$ to $17_n$. It is also connected to the input store 31 and output store 33 via bilateral connections for controlling and testing their operating conditions or, more accurately, the state of their connections to the central computer 4 and to the operations store 32.

The tone control circuit 35 is connected to the operations store 32, to the logic network 34, to the five outputs 61–65 of the tone generator 6 and to the intermediate highways $21_1$ to $21_n$, so as to apply to the intermediate highway pair marked by the operations store 32 one of the three tones formed by the stand-by, dialling and busy tones or simultaneous the ringing and ringing-back tones which are coded differently so that they can be selected in the modem sets.

When a connection between a calling subscriber $10_1$ and an intermediate highway pair $21_1$ $21_2$ is cyclically established at the sampling frequency during a time interval slot $t$ by the conventional means hereinbefore set forth, then, provided that the availability signal of the store 31 reaches the computer 4 via the set of gates 37, the computer 4 addresses to the input transfer store 31 of the multiregister 3 the address of the line $10_1$ and of the intermediate highway pair $21_1$, $21_2$ via lead 311, and data distinguishing the dialling phase into which the prospective call is entering, via lead 312, whereafter the computer 4 transmits an order signal via the gates 36 upon transfer of these data to the input store 31. The tone control circuit 35 then applies the dialling tone to intermediate highway $21_2$ during each time slot $t$ until the test signal received by the logic network 34 during the time slot $t$ via the connection $17_1$ indicates an interruption in the loop of the line $10_1$, corresponding to the calling subscriber starting to dial, At each reading-out of the register word the logic network 34 registers in the same the loop interruptions detected at the time $t$ on the test wire $17_1$ until dialling is complete. It then actuates the output transfer store 33 into which—immediately it is available—the binary digits of the register word of the operations store 32 are transferred, so that the operations store 32 is cleared and is ready for another call. The output transfer store 33 warns the central computer 4 via the gates 37, and the computer 4 causes the transfer to itself of the binary digits contained in the output transfer store 33. This operation denotes the termination of the first action of the multiregister 3.

The central computer 4 then acts in known manner to perform the steps required to connect the called subscriber's line to the caller—i.e., referring to the simplified diagram in FIG. 1, to connect the called subscribed served, for instance, by modem set $1_n$ to the intermediate highways $21_1$, $21_2$ for the same time slot $t$ as the calling subscribed is connected to such highways—whereafter the computer 4 warns the multiregister 3 again in the same way as for its first intervention and transmits to the multiregister 3 the information that the phase of the communication to be processed is the trunking phase, the computer 4 also passing to the multiregister 3 the addresses of the calling and called subscribers and of the intermediate highways interconnecting their send-and-receive group highways. The multiregister 3 then supervises the two subscribers' lines by way of the test wires $17_1$, $17_n$ of their modem sets $1_1$, $1_n$, the transmission of the ringing and ringing-back tones to the intermediate highway pair $21_1$, $21_2$ until the called subscriber off-hooks, in which case trunking is complete or until a predetermined time has passed, whereafter the called subscriber is considered to be absent. In both cases the multiregister 3 warns the computer 4, at whose initiative the data contained in the processed register word are transferred to the computer 4, the register word being cleared and the second intervention of the multiregister 3 being terminated.

The central computer 4 controls in known manner the call release operations—i.e., storage of the calling subscriber's number and of the call start time, for charging purposes.

As will be seen in the detailed description to be given hereinafter, the multiregister 3 acts very similarly for the different kinds of operation performed at the exchange—local, outgoing, incoming and transit traffic and call release operations.

A description of the multiregister according to the invention and of how it operates will be given hereinafter with reference to a non-limitative embodiment in which the group highways of the crosspoint matrix 2 have sixteen time channels, the sampling period T is 128 $\mu$s. giving a frequency around 7.8 kc./s., and the duration of a basic or elementary time slot $t$ is $128/16=8\mu$s.

Each sampling period T comprises sixteen elementary time slots which are numbered $t_1$ to $t_{16}$ and which are distributed uniformly throughout the period T, each elementary slot corresponding to one time channel. Each elementary time slot $t_1$ to $t_{16}$ is divided into eight bit intervals which are numbered $\theta_1$ to $\theta_8$ and which have a duration of 1 $\mu$s.; each bit has a duration of 0.5 $\mu$s. and is separated from the adjacent ones by an interval of 0.5 $\mu$s. The bits circulating in the multiregister stores are grouped in eight-element words appearing at the output of the stores in concordance with the corresponding elementary time slots $t_1$ to $t_{16}$ of the sampling period T, and whose eight bits are is respective concordance with the eight bit intervals $\theta_1$ to $\theta_8$, so that each of the 128 $\mu$s. of a sampling period T can be defined by a value of $t$ between 1 and 16 and a value of $\theta$ between 1 and 8.

By way of example, a register word can be embodied as follows:

The phase of the operation being supervised by the multiregister is expressed by a number of seven bits $t_{16}\theta_1$ to $t_{16}\theta_7$. Dialling data take up the time slots $t_1$ to $t_6$, the slot $t_1$ being reserved for the indication, by a number of four bits $t_1\theta_5$ to $t_1\theta_8$, of the number of digits previously received while the slots $t_2$ to $t_6$ each serve to express two of the ten decimal digits of dialling by their four bits $\theta_1$ to $\theta_4$ and $\theta_5$ to $\theta_8$. The slots $t_7$, $t_8$, $t_9$ and the first two elements $\theta_1$, $\theta_2$ of slot $t_{10}$ are allotted to time recordings serving to fix signal calibrations and waiting limits, for instance, the normal interval between dialling pulses and the double interval to be interpreted as the end of a digit, another double delay interval before release of an open line, the maximum waiting time for a junctor, the maximum time for which a called subscriber is rung and the calibration of ringing signals and inter-office pulses. Elements $\theta_3$ to $\theta_6$ of slots $t_{10}$, $t_{11}$ are allotted to the recording of the results of the three most recent scannings of the subscribers' line loops and of the majority result of the 3 scannings immediately previous to the present scanning, at slot $t_{10}$ in the case of the calling subscriber and at slot $t_{11}$ in the case of the called subscriber, only this majority result being considered in order to reduce errors due to very brief interruptions of the loops. Slot $t_{12}$ is used for the accounting of the multiregister 3 to the central computer 4, for instance, the start and end of the charging time, taking of a line or circuit under supervision, release of a route, disconnections or fault. A parity digit can be provided in slot $t_{13}$ for checking purpose.

The address register-words comprise only sixteen bits, included in two consecutive time slots $t_{i-1}$ and $t_i$, the latter being the one which is allotted to the call affecting the particular register word concerned. The three bits $t_{i-1}\theta_2$ to $\theta_4$ mark the address from 1 to 7 of the pair of intermediate highways used in the crosspoint matrix 2, the zero address never being used for an intermediate highway. The four bits $t_{i-1}$ $\theta_5$ to $\theta_8$ mark the address from 1 to 14 of the modem set serving the calling subscriber. The four bits $t_i\theta_5$ to $\theta_8$ mark the address from 1 to 14 of the modem set serving the called subscriber.

The following special signals whose function will become apparent during the following detailed description, are also used:

A signal $\alpha$ of duration $T$=128 $\mu$s. and of recurrence time $2T$=256 $\mu$s., and the complementary signal $\bar{\alpha}$ and, derived therefrom, a general resetting signal Rz;

A signal $\eta$ and its complementary signal $\bar{\eta}$, of the same duration and recurrence time as the signals $\alpha$ and $\bar{\alpha}$ but with a 12 $\mu$s. offset therefrom;

Two signals $h_1$, $h_2$ of 250 nanoseconds duration and 1 $\mu$s. recurrence time and offset from one another by 500 nanoseconds, and A signal $\beta$ of 500 nanoseconds duration and 1 $\mu$s. recurrence time whose leading edge coincides with the leading edge of the signal $h_1$.

The signals $\alpha$, $\eta$ and their complementaries can be obtained from bits $t_{15}\theta_6$ and $t_1\theta_2$ of the register words, no other significance being provided for these bits, by means of a circuit such as is shown in FIG. 2 wherein a bistable 301 is actuated symmetrically at each instant $t_{15}\theta_6$ so as to deliver alternately at its 1 and 0 outputs the 128 $\mu$s.—duration signal $\alpha$ and $\bar{\alpha}$, the state of the bistable 301 being transferred via the and-gate 303, 304, which open at the time $t_1\theta_2$—i.e., 12 $\mu$s. later—to a bistable 302 whose 1 and 0 outputs therefore deliver the signals $\eta$ and $\bar{\eta}$. Signal Rz is delivered at the time $t_{14}\theta_4$ by an and-gate 305 which has one input connected to the 0 output of the bistable 301 and therefore imposes the $\bar{\alpha}$ condition to give the signal Rz a 256 $\mu$s. recurrence time.

Figure 3:
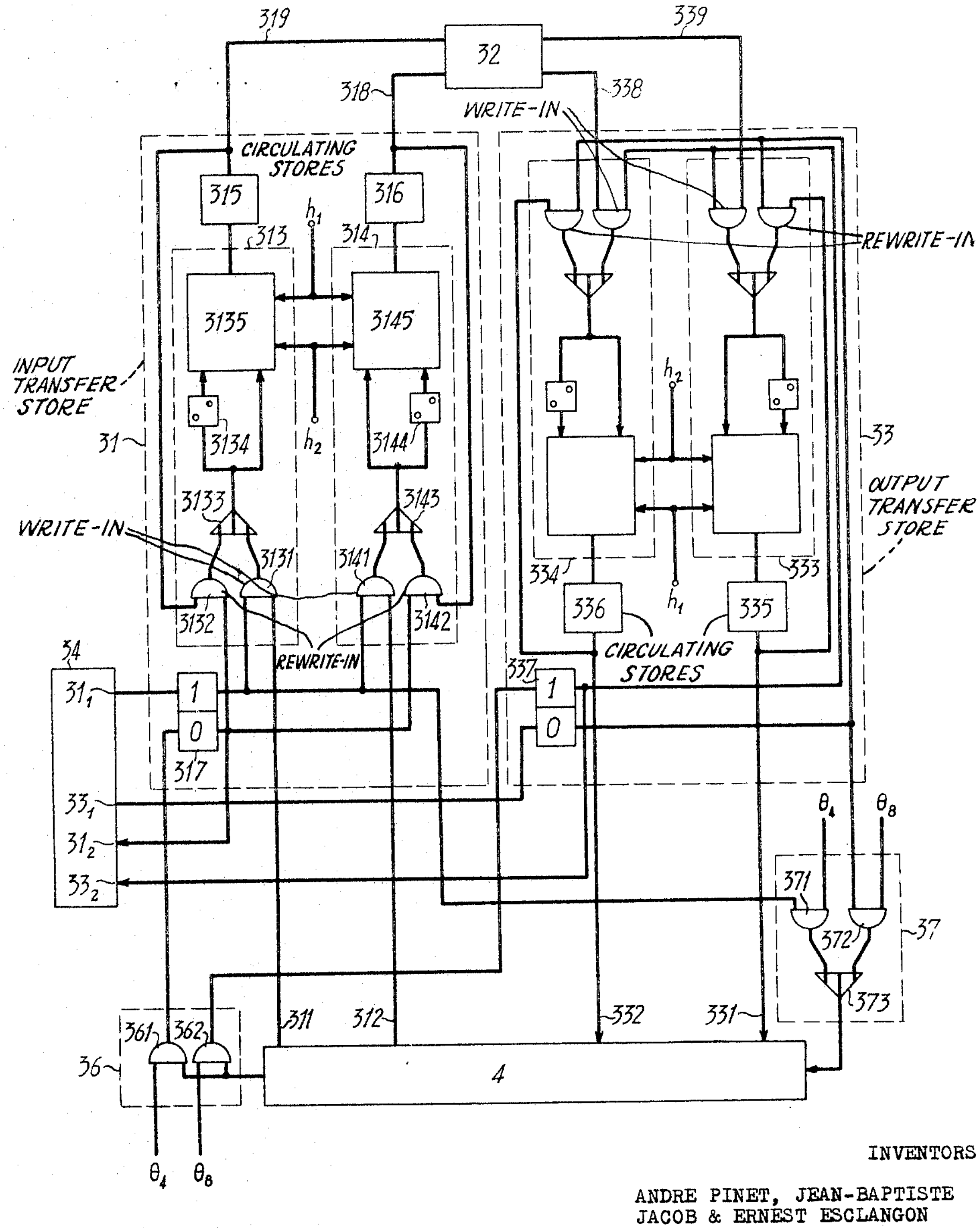
FIG. 3 is a diagram of the input and output transfer stores of the multiregister according to the invention.

FIG. 3 is a block diagram of the input transfer store 31 and output transfer store 33 with their main connections to the central computer 4, to the logic network 34 and to the operations store 32. The stores 31, 33 are identical and each comprises two identical systems allotted the one to the data and the other to the addresses, each such system comprising a write-in-rewrite-in circuit having 1 $\mu$s. delay time and a circulating store, for instance, in the form of a magnetostriction delay line having a 127 $\mu$s. delay time, so that the cumulated delay time of each system of a store and of its write-in-rewrite-in circuit is equal to the sampling-time duration T of 128 $\mu$s.

The input transfer store 31 therefore comprises a write-in-rewrite-in circuit 313 and a circulating store 315, for data, and a similar circuit 314 and store 316, for addresses, and a bistable 317 controlling access conditions to the circuits 313, 314. The circuit 313 comprises two input and-gates, a write-in and-gate 3131 and a rewrite-in and-gate 3132, whose outputs are connected via an or-gate 3133 directly and via an inverter 3134 to two inputs of a shift register 3135 whose output is connected to the input of circulating store 315. The output thereof is connected to one input of the rewrite-in gate 3132 and via lead 319 to an input of the operations store 32. Similarly, the write-in-rewrite-in circuit 314 comprises two gates 3141, 3142 for write-in and rewrite-in respectively, an or-gate 3143, an inverter 3144, and a shift register 3145 whose output is connected to the input of circulating store 316, the output thereof being connected to one input of the gate 3142 and via lead 318 to one input of the operations store 32. The data write-in gate 3131 and address write-in gate 3141 have one of their inputs connected to the central computer 4, the former via lead 311 and the latter via lead 312 while their other inputs are connected to the 1 output of bistable 317, such output being operative when the bistable is in the one-state. The second inputs of the rewrite-in gates 3132, 3142 are connected to the 0 output of the bistable 317.

Output transfer store 33 similarly comprises two write-in-rewrite-in circuits 333, 334 whose respective write-in inputs are connected via connections 339, 338 to the data and address outputs of the operations store 32, two circulating stores 335, 336 having their output connected to the central computer 4, the former via connection 331 and the second via connection 332, and a bistable 337 which when in the 1 state opens the write-in inputs of the circuits 333, 334 and which when in the 0 state opens their rewrite-in inputs.

The inputs for bringing the bistable 317 into the 1 state in which it opens the write-in gates 3131, 3141 of input store 31 is connected to output $\mathbf{31}_1$, of the logic network 34, and the 1 output of bistable 317 is connected to one input of the central computer 4 via an and-gate 371 which opens at the time $\theta_4$ of each time slot and via an or-gate 373 forming part of the gate set 37. The input for resetting the bistable 317 to the 0 state in which it opens the rewrite-in gates 3132, 3142 of the operations store 32 is connected via an and-gate 361 of gate set 36 to an output of the central computer 4 which supplies a resetting signal at the time $\theta_4$ following the transmission of the final bit of a register word. The zero output of bistable 317 is connected to input $\mathbf{31}_2$ of the logic network 34.

In symmetrical manner, bistable 337 is brought to the 0 state in which it opens the rewrite-in inputs of output store 33, by a signal through terminal $\mathbf{33}_1$ of logic network 34, this state being indicated to computer 4 via an and-gate 372 and gate 373 of gate set 37 at each time $\theta_8$; and to the 1 state, in which it opens the write-in inputs of output store 33, via a second gate 362 of gate set 36, and at the time $\theta_8$, by the computer 4 when the same has received the final bit of a register word and the 1 output of bistable 337 is connected to input $\mathbf{33}_2$ of logic network 34.

At each "revolution" of the register words, the shift registers, as 3135, 3145, bring the rewrite-in pulses into phase again with the clock pulses $h_1$, $h_2$, the write-in pulses from the central computer 4 being synchronized with the signals $h_2$.

Figure 4:
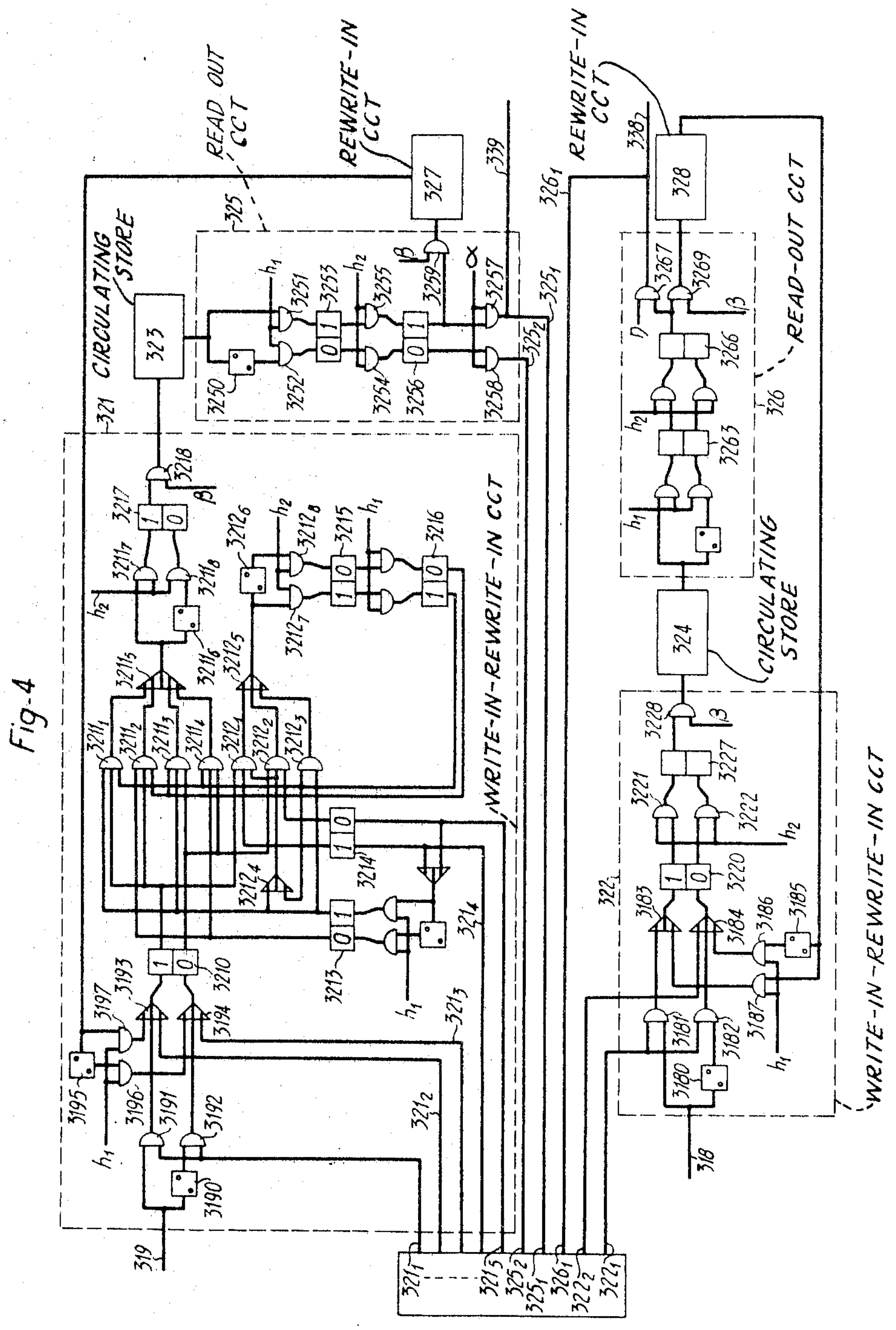
FIG. 4 is a diagram of the operations store of the multiregister according to the invention.

FIG. 4 is a diagram of the operations store 32. The same comprises two circulating memory systems allotted the one to data and the other to addresses and each comprises a write-in-rewrite-in circuit 321, 322 respectively having a 1 $\mu$s. operating time, a respective circulating store 323, 324, for instance of the magnetostriction kind, having a 3070 $\mu$s. delay time, a read-out circuit 325, 326 having a 1 $\mu$s. operating time, and an auxiliary rewrite-in store 327, 328 having a 128 $\mu$s. delay time, so that its total capacity is 125 register words of 128 bits.

The write-in-rewrite-in circuit 321 of operations store 32 mainly comprises an input bistable 3210 and an output bistable 3217 interconnected via an addition-subtraction circuit. The 1 and 0 inputs of bistable 3210 are connected to the outputs of two or-gates 3193, 3194 respectively, each such or-gate having three inputs so that the bistable 3210 can be controlled either from store 31 via connection 319 or from rewrite-in store 327 or directly from logic network 34 via write-in and erase connections $\mathbf{321}_2$, $\mathbf{321}_3$ respectively. Connection 319 is connected to one input of gate 3193 via an and-gate 3191 and to one input of gate 3194 via an inverter 3190 and an and-gate 3192. The control inputs of gates 3191, 3192 are connected via connection $\mathbf{321}_1$ to the logic network 34 which permits the transfer of the consecutive bits of a register word circulating while waiting in the input store 31 at the time when an available register word pigeonhole of the circulating store 323 appears, as will be seen hereinafter. The output of rewrite-in store 327 is connected to one input of gate 3193 by an and-gate 3197 and to one input of gate 3194 by an inverter 3195 and an and-gate 3196. The control inputs of gates 3196, 3197 are connected to that output of a time base (not shown) which delivers the signal $h_1$ as hereinbefore defined. The write-in and erase signals delivered by logic network 34 via connections $\mathbf{321_2}$, $\mathbf{321_3}$ have a 500-nanosecond duration which takes up the first half of each microsecond, so that their leading edge coincides with the leading edge of the signal $h_1$, lasting only 250 nanoseconds, whereby the write-in and erase signals are predominating over the rewrite-in signals.

The 1 and 0 outputs of bistable 3210 are connected together to the 1 and 0 inputs of bistable 3217 via a set of and-gates $\mathbf{3211_1}$ to $\mathbf{3211_4}$ and via an or-gate $\mathbf{3211_5}$ connecting the outputs of the four latter and-gates to the 1 input of bistable 3217, via and-gate $\mathbf{3211_7}$, and to the zero resetting input of bistable 3217, via an inverter $\mathbf{3211_6}$ and and-gate $\mathbf{3211_8}$. Gates $\mathbf{3211_7}$ and $\mathbf{3211_8}$ open simultaneously at time $h_2$—i.e., at the start of the second half of each microsecond. The 1 output of bistable 3217 is connected to the input of circulating store 323 via an and-gate 3218 which is open by the pulse $\beta$ as hereinbefore defined—i.e.,during the first half of each microsecond.

Through the agency of the gate set $\mathbf{3211_1}$ to $\mathbf{3211_5}$, the state of bistable 3210 can be transferred to bistable 3217 either unchanged or plus or minus one unit in accordance with the instructions of logic network 34, allowing for carry-overs. Gate set $\mathbf{3211_1}$ to $\mathbf{3211_5}$ is controlled: by a bistable 3213 which at the time $h_1$ is brought either to the 1 state if an addition-order signal is present on connection $\mathbf{321_4}$ or a subtraction-order signal is present on connection $\mathbf{321_5}$, or to the 0 state in the absence of either of the latter signals; and by a bistable 3216 whose state indicates whether or not the previous operation has given rise to a carry-over. Bistable 3216 is the output bistable of a shift register having a 1 microsecond delay time and controlled by a set of three and-gates $\mathbf{3212_1}$, $\mathbf{3212_2}$, $\mathbf{3212_3}$ and of two or-gates $\mathbf{3212_4}$, $\mathbf{3212_5}$, which are dependent upon the bistables 3210, 3213, and of a bistable 3214 which is brought to the 1 state when an addition signal appears on connections $\mathbf{321_4}$ and which is brought to the 0 state when a subtraction signal appears on connection $\mathbf{321_5}$. Bistable 3214 therefore stores the final addition or subtraction order given by logic network 34 so that any carry-over arising can travel as far as necessary.

The 1 output of bistable 3210 is connected to one input of each of the gates $\mathbf{3211_1}$, $\mathbf{3211_2}$, $\mathbf{3212_1}$. The 0 output of bistable 3210 is connected to the gates $\mathbf{3211_3}$, $\mathbf{3211_4}$, $\mathbf{3212_2}$. The 1 output of bistable 3213 controls the gates $\mathbf{3211_1}$, $\mathbf{3211_3}$ and $\mathbf{3212_3}$ and—via or-gate $\mathbf{3212_4}$, whose second input is connected to the 1 output of bistable 3216—the gates $\mathbf{3212_1}$, $\mathbf{3212_2}$. The 0 output of bistable 3213 controls gates $\mathbf{3211_2}$, $\mathbf{3211_4}$. The 1 output of bistable 3216 controls gates $\mathbf{3211_1}$, $\mathbf{3211_4}$, $\mathbf{3212_3}$ and, as already seen, via gate $\mathbf{3212_4}$, the gates $\mathbf{3212_1}$, $\mathbf{3212_2}$ which are also controlled by the 1 output and 0 output, respectively, of bistable 3214. The outputs of gates $\mathbf{3212_1}$, $\mathbf{3212_2}$, $\mathbf{3212_3}$ are connected to the 3 inputs of gate $\mathbf{3212_5}$ whose output is connected by an and-gate $\mathbf{3212_7}$, which opens at the time $h_2$, to the 1 input of a bistable 3215 and, via an inverter $\mathbf{3212_6}$ in series with a gate $\mathbf{3212_8}$ opening at the time $h_2$, to the zero-resetting input of bistable 3215. The 1 and 0 outputs thereof are connected to the same-named inputs of the bistable 3216 by and-gates which open at the time $h_1$.

Consequently, the gates $\mathbf{3211_1}$, $\mathbf{3211_3}$ are blocked in the absence of additon-instruction or subtraction-instruction signals—i.e., when the bistable 3213 is in the 0 state. If there is no carry-over from the previous operation—i.e., if the bistable 3216 is in the 0 state—the gate $\mathbf{3211_4}$ is also closed; consequently, the bistable 3217 is brought at the time $h_2$ into the same state as the bistable 3210—i.e., into the 1 state, if gate $\mathbf{3211_2}$ supplies a signal and into the 0 state if the gate $\mathbf{3211_2}$ does not supply a signal. Since the three gates $\mathbf{3212_1}$, $\mathbf{3212_2}$, $\mathbf{3212_3}$ are in the closed state, no carry-over is written in. If, on the other hand, a carry-over from the previous operation is indicated by the bistable 3216 being in the 1 state, the gate $\mathbf{3211_2}$ is also in the closed state; consequently, at the time $h_2$ the bistable 3217 is brought to the opposite state to that of the bistable 3210—i.e., into the 1 state, if the gate $\mathbf{3211_4}$ supplies a signal, and into the 0 state if the gate $\mathbf{3211_4}$ does not supply a signal. If the previous carry-over was the result of an adding-operation, the bistable 3214 is in the 1 state and a carry-over is written in by gate $\mathbf{3212_1}$ if the bistable 3210 is in the 1 state, but if the previous carry-over was the result of a subtraction operation, the bistable 3214 is in the 0 state and a carry-over is written in by gate $\mathbf{3212_2}$ if the bistable 3210 is in the 0 state.

In the presence of an addition-instruction signal, the bistables 3213, 3214 are in the 1 state and the gates $\mathbf{3211_2}$, $\mathbf{3211_4}$, $\mathbf{3212_2}$ are in the closed state. If there is no carry-over from the previous operation i.e., if the bistable 3216 is in the 0 state—the gate $\mathbf{3211_1}$ $\mathbf{3212_4}$ are also in the closed state, and so at the time $h_2$ the bistable 3217 comes into the state opposite to the state of the bistable 3210—i.e., into the 1 state, if the gate $\mathbf{3211_3}$ delivers a signal and into the 0 state in the opposite case—and a carry-over is then written in by the gate $\mathbf{3212_1}$. If the bistable 3216 is in the 1 state, the gates $\mathbf{3211_2}$, $\mathbf{3211_3}$ are in the closed state, and so the bistable 3217 comes into the same state as the bistable 3210—i.e., is brought into the 1 state by the gate $\mathbf{3211_1}$, the gate $\mathbf{3212_1}$, writing—in a carry-over or, into the 0 state by the inverter $\mathbf{3211_6}$, the gate $\mathbf{3212_3}$ writing-in a carry-over.

When a subtraction-order signal is given, the bistables 3213, 3214 are in the 1 and 0 states respectively and the gates $\mathbf{3211_2}$, $\mathbf{3211_4}$, $\mathbf{3212_1}$ are in the closed state. In the absence of carry-over, the bistable 3216 in the 0 state closes the gates $\mathbf{3211_1}$, $\mathbf{3212_3}$; the bistable 3217 is brought into the 1 state by the gate $\mathbf{3211_3}$ if the bistable 3210 is in the 0 state, the gate $\mathbf{3212_2}$ writing-in a carry-over, otherwise the bistable 3217 is in the 0 state and no carry-over is written-in. If the bistable 3216 is in the 1 state, the carry-over which it indicates compensates for the instructed subtraction and the bistable 3217 becomes of the same state as the bistable 3210—i.e., either the 1 state, via gate $\mathbf{3211_1}$, or the 0 state, via inverter $\mathbf{3211_6}$, in both cases with a write-in of a carry-over by gate $\mathbf{3212_3}$.

The read-out circuit 325 comprises a shift register having a 1 $\mu$s. delay time and three output gates—one pair of gates 3257, 3258 which transmit during the time of the $\alpha$ signals the consecutive bits stored in the store 323 to the logic network 34 via connections $\mathbf{325_1}$, $\mathbf{325_2}$ and to the output store 33 via connection 339; and one gate 3259 which during the time of the $\beta$ signals transmits the readout signals of the store 323 to the auxiliary rewrite-in store 327. The shift register of read-out circuit 325 comprises two and-gates 3251, 3252 which open at the time $h_1$ to connect the output of circulating store 323 to the 1 input and-in series with an inverter 3250 to the 0-resetting input, respectively, of a bistable 3253; and a second set of and-gates 3255, 3254 which open at the time $h_2$ and which connect the outputs of bistable 3253 to the same-named inputs, respectively, of a bistable 3256 whose 1 output is connected to gates 3257, 3259 and whose 0 output is connected to gate 3258.

Consequently, all the bits appearing at the output of circulating store 323 are written into the auxiliary rewrite-in store 327 during the first half of the microsecond following their storage in bistable 3253, and the consecutive register words of the circulating store 323 are transmitted only in the propulsion of one out of two to the logic network 34 and to the output 33. Since the delay time of store 327, which is equal to the duration of one register word, is added to the delay time of the circulating store 323, which is equal to the duration of 24 register words, each register word is processed every 6400 μs.

The addresses section of the operations store 32 is similar to the data section hereinbefore described but is simpler, since the addresses do not have to be modified like the corresponding data. Consequently, the write-in-rewrite-in circuit 322 has no addition-subtraction circuit between its input bistable 3220 and its output bistable 3227, the same being interconnected via a set of gates 3221, 3222 which open at the time $h_2$, the 1 output of bistable 3227 being connected to the input of circulating store 324 via an and-gate 3228 which is open by the signal $\beta$ like the similar gate 3218 of circuit 321. The change-over of bistable 3220 into the 1 state is controlled by an or-gate 3183 which has only two inputs, and the zero-resetting input of bistable 3220 is controlled by a three-input or-gate 3184. The first inputs of gates 3183, 3184 are connected to output connection 318 of the addresses section of input store 31 via an and-gate 3181 and via an inverter 3180 in series with an and-gate 3182, respectively, the opening inputs of these and-gates being connected by a connection $322_1$ to an output of the logic network 34 which permits the write-in of an address into the circulating store 324 simultaneously with the write-in of the corresponding data into the circulating store 323. The second input of gate 3183 and the second input of gate 3184 are connected to the output of the auxiliary rewrite-in store 328 via an and-gate 3187, which opens at the time $h_1$, and via an inverter 3185 in series with an and-gate 3186, respectively, the latter gate also opening at the time $h_1$. The third input of gate 3184 is connected to logic network 34 via an erase connection $322_2$ whose signals start simultaneously with the rewrite-in signals and last twice as long as the latter and therefore erase them.

Like the similar circuit 325, the read-out circuit 326 comprises a shift register having two bistables 3263, 3266 to which each bit appearing at the output of circulating store 324 is transferred at the time $h_1$ and $h_2$ respectively, the 1 output of the bistable 3266 being connected to the input of the auxiliary rewrite-in store 328 by an and-gate 3269, which like its counterpart 3259 opens at the signal $\beta$, and via an and-gate 3267 opening at the signal $\eta$—i.e., with a 12 μs. offset relatively to the counterpart gate 3257—to the output store 33 by the connection 338 and to the logic network 34 via a connection $326_1$.

Figure 5:
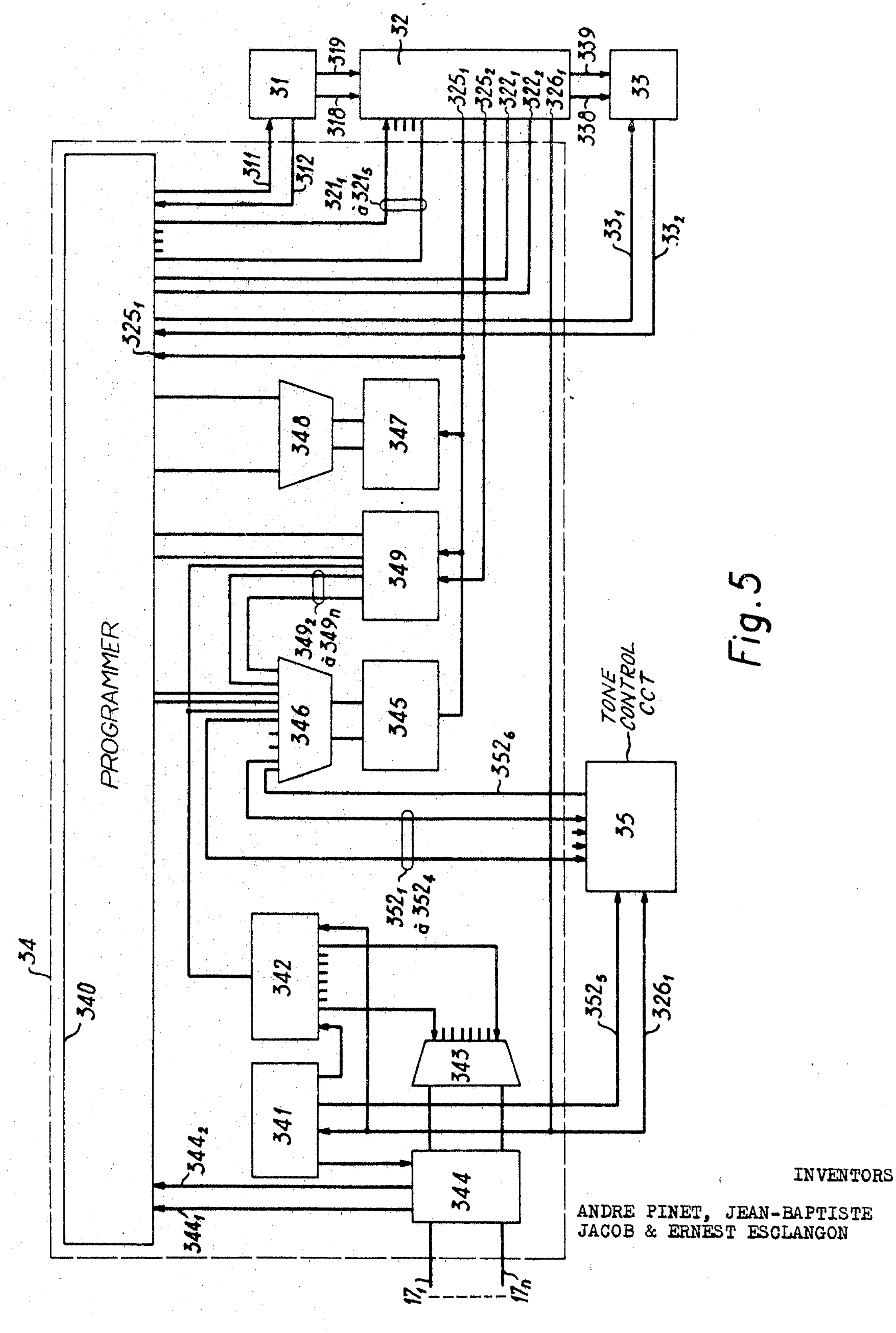
FIG. 5 is a general diagram of the multiregister according to the invention, showing more particularly its logic network in block schematic form.

As can be seen in FIG. 5, the logic network 34 comprises a programmer 340 and associated elements which can be broken down into a first group 341–344, for processing the address-register words appearing on connection $326_1$, and a second group 345–439, for processing the data register words appearing on connection $325_1$, $325_2$. The first group comprises a time counter 341, a circuit 342 for storing the address of the modem sets of the calling or called subscribers as require supervision, and an associated decoder 343 whose outputs control a circuit 344 for selecting the test wires $17_1$ to $17_n$, the latter circuit transmitting the signals collected on the test wires to the programmer 340 via a two-wire connection $344_1$, $344_2$.

Figure 6:
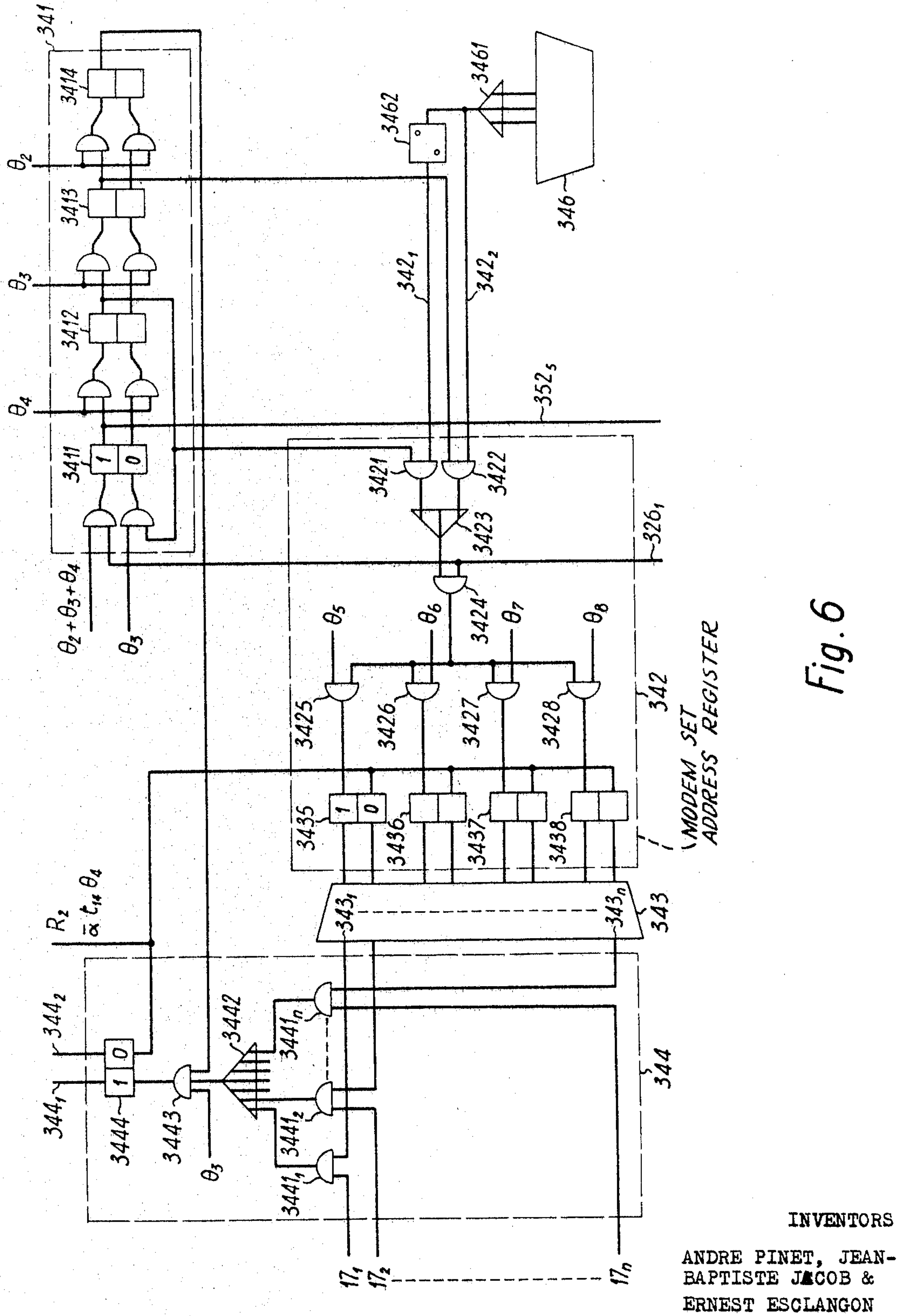
FIG. 6 shows a first part of the logic network shown in FIG. 5.

The circuits 341–344 are shown in greater detail in FIG 6.

The time counter 341 is a shift register with a special kind of operation. It comprises 4 bistables 3411 to 3414 whose 1 inputs and 0 resetting inputs are controlled by two and-gates respectively. The access gate to the 1 input of the bistable 3411 is opened at the times $\theta_2$, $\theta_3$, $\theta_4$, and its second input is connected to connection $326_1$. The zero-resetting gate of bistable 3411 opens at the time $\theta_3$ and its second input is connected to the 1 output of bistable 3412. The gates controlling the bistables 3412–3414 open at the times $\theta_4$, $\theta_3$, $\theta_2$, respectively when they transfer to each of these bistables the state of the previous bistable.

The circuit 342 comprises two input control gates 3421, 3422 whose outputs are connected by an or-gate 3423 to one input of an and-gate 3424 whose second input is connected to connection $326_1$ and whose output is connected to four and-gates 3425–3428 which open at the times $\theta_5$, $\theta_6$, $\theta_7$, $\theta_8$ respectively, and controlling the 1 input of four bistables 3435–3438 whose zero-resetting inputs are connected to the programmer 340 via the general resetting connection Rz which is brought into operation at the time $t_{14}\theta_4$ in the presence of the signal $\bar{\alpha}$, is hereinbefore mentioned, with reference to FIG. 2. Gate 3421 is an and-gate having two inputs, one connected to the 1 output of bistable 3412 and the other to a phase decoder 346 via or-gate 3461, inverter 3462 and connection $342_1$. Gate 3422 is also an and-gate having two inputs, one connected to the 1 output of bistable 3413 and the other connected to the output of gate 3461 via a connection $342_2$.

Decoder 346 will be disclosed in further detail hereinbelow. For the time being, it is sufficient to know that the part of the register word relative to the phase is read-out by register 345 and decoded by decoder 346. This decoder has 128 output terminals and a signal appears on the terminal involved by the phase actually implemented.

Decoder 343 has eight inputs respectively connected to the 1 and 0 outputs of the bistable 3435–3438, and as many outputs as the switching system has modem sets.

Circuit 344 comprises a set of fourteen and-gates $3441_1$ to $3441_n$ each having one input connected to one of the test lines $17_1$ to $17_n$ and its second input connected to the corresponding output of the decoder 343 and an or-gate 3442 connecting the outputs of the $n$ gates $3441_1$ to $3441_n$ to the 1 input of a bistable 3444 via an and-gate 3443 having three inputs which open at the time $\theta_3$ and having its third input connected to the 1 output of bistable 3414. The 1 and 0 outputs of the bistable 3444 are connected to programmer 340 via respective connections $344_1$, $344_2$, and the zero-resetting input of bistable 3444 is connected to connection Rz.

An intermediate highway address, since it can never be zero, appears on connection $326_1$ as at least one signal at one of the times $\theta_2$, $\theta_3$, $\theta_4$ of a time interval $t_{i-1}$, so that at the time $t_{i-1}\theta_4$ the bistables 3411, 3412 are in the 1 state and at the time $t_i\theta_3$ the bistable 3411 is reset to zero simultaneously as the bistable 3413 changes over to the 1 state. At the time $t_i\theta_4$ the bistable 3412 is also zero-reset. At the time $t_{i+1}\theta_2$ the bistable 3414 changes over to the 1 state. At the time $t_{i+1}\theta_3$ the bistable 3413 is zero-reset, and the time $t_{i+2}\theta_2$ the bistable 3414 is zero reset.

Consequently, when an intermediate highway address appears at the times $t_{i-1}\theta_2$ to $t_{i-1}\theta_4$ at the output of operations store 32, the bistable 3412 opens gate 3421 for the time $t_{i-1}\theta_4$ to $t_i\theta_4$ and bistable 3413 opens gate 3422 for the time $t_i\theta_3$ to $t_{i+1}\theta_3$. In the case in which the subscriber to be tested is the caller, no signal appears at the output of gate 3461, and so the inverter 3462 applies a signal via connection $342_1$ to gate 3421, such signal opening gate 3424 for the time $t_{i-1}\theta_4$ to $t_i\theta_4$, so that the signals appearing on connection $326_1$ at times $t_{i-1}\theta_5$ to $\theta_8$ are applied via the gates 3425 to 3428 to bistables 3435 to 3438 respectively, which thus store the address of the modem set serving the calling subscriber. At the time $t_{i-1}\theta_8$ the decoder 343 opens whichever of the gates $3441_1$ to $3441_n$ which receives the test wire $17_1$ to $17_n$ of the marked modem set. The inputs of gate 3461 are connected to all those outputs of the decoder 346 which correspond to phases during which the subscriber's line to be tested is the line of the called subscriber. In this case, a signal is applied via connection $342_2$ to gate 3422, such signal opening gate 3424 for the time $t_i\theta_3$ to $t_{i+1}\theta_3$, so that the signals appearing on connection 326, at the times $t_i\theta_5$ to $t_i\theta_8$ and representing the address of the called subscriber's modem set are stored in bistables 3435 to 3438. The gate $3441_1$ to $3441_n$ corresponding to the latter address opens at the time $t_i\theta_8$.

Testing, whether of a calling or called subscriber, is effected only upon the opening of the gate 3443 which the bistable 3414 keeps closed until the time $t_{i+1}\theta_2$ and therefore at the time $t_{i+1}\theta_3$. Bistable 3444 then either comes into the 1 state or stays in the 0 state, in dependence upon the result of the test which reaches the programmer 340 via connections $344_1$, $344_2$.

Figure 7:
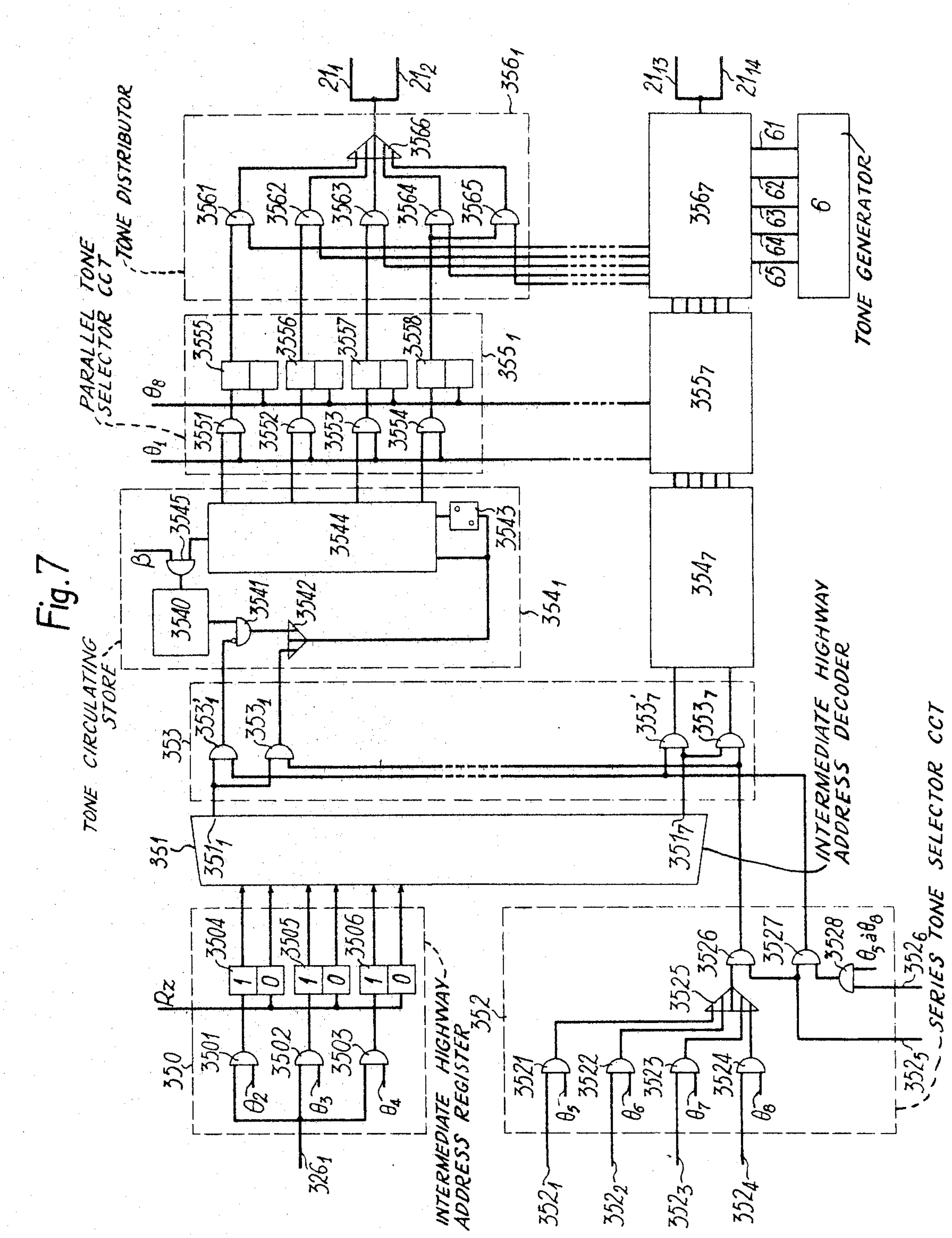
FIG. 7 shows the tone transmission control circuit of the multiregister shown in FIG. 5.

FIG. 7 is a diagram of the tone control circuit 35 comprising:

An intermediate highway address register 350 and an associated decoder 351:

A tone selector circuit 352 for instructing the transmission or cessation of a selected tone on a selected intermediate highway;

A gate set 353 for routing the instructions of the circuit 352 to the junction lines marked by circuit 350;

A system comprising seven identical circulating stores $354_1$ to $354_7$ allotted to each intermediate highway pair $21_1$, $21_2$ to $21_{n-1}$, $21_n$, respectively, of the crosspoint matrix 2;

A system of seven identical circuits $355_1$ to $355_7$ for transferring instructions about the transmission and cessation of tones to each intermediate highway pair, and A system of seven identical gate sets $356_1$ to $356_7$, controlling the transmission and cessation of the various tones delivered by the tone generator 6 to each intermediate highway pair $21_1$, $21_2$ to $21_{13}$, $21_{14}$.

The intermediate highway address register 350 comprises three and-gates 3501 to 3503 each having one input connected to the address output connection $326_1$ of the operations store 32 and opening respectively at the times $\theta_2$, $\theta_3$, $\theta_4$, the outputs of the latter and-gates being connected to the 1 inputs of three bistables 3504 to 3506, respectively. The zero-resetting inputs thereof are interconnected via the general resetting connection Rz of programmer 340.

The decoder 351 has six inputs connected to the 1 and 0 outputs of the bistables 3504 to 3506 respectively and—since the zero address is never used for an intermediate highway—seven outputs $351_1$ to $351_7$ each controlling in the gate set 353 a gate pair $353_1$, $353'_1$ to $353_7$, $353'_7$ of corresponding index.

The circuit 352 comprises four tone-selecting and-gates 3521 to 3524 which are connected to the phase decoder 346 by respective connections $352_1$ to $352_4$ and which open at the times $\theta_5$ to $\theta_8$, an or-gate 3525 connecting the outputs of the four gates 3521 to 3524 to an input of a tone write-in and-gate 3526 whose second input is connected to the 1 output of the bistable 3411 of the time counter 341 by a connection $352_5$, and a tone erase and-gate 3527 having one input connected to the connection $352_5$ and the second input controlled by an and-gate 3528 which opens at the times $\theta_4$ to $\theta_7$ and which is connected via a connection $352_6$ to the phase decoder 346.

The output of gate 3526 is connected to the opening input of each of gates $353_1$ to $353_7$, and the output of gate 3527 is connected to the opening input of each of the gates $353'_1$ to $353'_7$.

The gate set pairs $353_1$, $353'_1$ to $353_7$, $353'_7$ control the transmission and cessation, respectively, of the tones delivered by the generator 6 to the intermediate highway pairs $21_1$, $21_2$ to $21_{13}$, $21_{14}$ via identical circuit chains $354_1$, $355_1$, $356_1$ to $354_7$, $355_7$, $356_7$ and only the circuits $354_1$, $355_1$, $356_1$ will be described hereinafter.

Circuit $354_1$ is a circulating store having a 128 $\mu$s. delay time and comprising a delay line 3540 having a 124 $\mu$s. delay time, a rewrite-in gate 3541, a write-in gate 3542, and a multiple-output shift register 3544 having a total delay time of 4 $\mu$s., the end output of which being connected to the input of delay line 3540 via an and-gate 3545 which the signal $\beta$ opens during the first half of each microsecond. The rewrite-in gate 3541 is an inhibiting gate whose inhibiting input is connected to the output of the erase gate 3527 via gate $353'_1$. Gate 3542 is an or-gate having 2 inputs, one connected to the output of delay line 3540 via inhibiting gate 3541 and the other connected to the output of write-in gate 3526 via gate $353_1$. Shift register 3544 has two inputs, one directly connected, and the other connected via an inverter 3543, to the output of gate 3542. Register 3544 has four stages each with a 1 $\mu$s. delay time and can be embodied by two bistables operated in cascade at the times $h_1$, $h_2$ like the shift register of the read-out circuit 325 of the operations store 32. The 1 outputs of the four stages of the register 3544 respectively control four input gates 3551 to 4554 of transfer circuit $355_1$. The latter four gates open together at the time $\theta_1$, the signals from the circuit 352 at the inputs $\theta_4$ to $\theta_7$ then being applied to the respective input of each of them.

The transfer circuit $355_1$ also comprises four bistables 3555 to 3558 whose 1 inputs are respectively connected to the outputs of the gates 3551 to 3554 and which are reset to zero at each time $\theta_8$.

The gate set $356_1$ comprises five and-gates 3561 to 3565 and one or-gate 3566 connecting their outputs to the two intermediate highways $21_1$, $21_2$. The gates 3561 to 3565 each have two inputs, the first of which is connected to outputs 61 to 65 of tone generator 6, at which outputs there are permanently delivered the dialling, busy, waiting, ringing and ringing back tones, and the second of which is connected to the 1 output of bistables 3555 to 3558, that one of such bistables which is in the 1 state denoting the or each tone to be transmitted, the bistable 3558 simultaneously controlling the two ringing and return-of ringing gates 3564, 3565.

When an intermediate highway address appears in the time slot $t_{i-1}\theta_2$ to $\theta_4$ on connection $326_1$, decoder 351 opens a gate pair $353_1$, $353'_1$ to $353_7$, $353'_7$, giving access to the marked intermediate highway pair $21_1$, $21_2$ to $21_{13}$, $21_{14}$. The phase decoder 346 selects the tone to be applied to this intermediate highway pair by marking one of the gates 3521 to 3524 via the corresponding connection $352_1$ to $352_4$, so that the opening time $\theta_5$, $\theta_6$, $\theta_7$ or $\theta_8$ of the selected gate serves to identify the appointed tone. Since the bistable 3411 is reset to zero only at the time $t_i\theta_3$, the gate 3526 is opened by the connection $352_5$ connected to the 1 output of the latter bistable, at the time when the gate 3526 receives the tone-designating signal which is therefore entered, during the time interval $t_{i-1}\theta_4$ to $\theta_7$, into the circulating store $354_1$ to $354_7$ serving the designated intermediate highway pair and transferred at the time $t_i\theta_1$ to the bistable to 3555 to 3558 corresponding to the designated tone, such bistable opening the gates 3561 to 3563 or the associated gates 3564, 3565 from $t_i\theta_1$ to $t_i\theta_8$. The tone transmission signal which has thus been written into a circulating store $354_1$ to $354_7$ appears every 128 $\mu$s. at the input of the gate 3551 to 3554 controlling access to the bistable 3555 to 3558 corresponding to the selected tone and is stored in such bistable at every time $t_i\theta_1$ and is transmitted to the intermediate highway pair served by the latter circulating store during each time slot $t_i$ as long as it continues to be rewritten in—i.e., until an inhibiting signal is applied to the rewrite-in gate 3541. When the phase read during the time interval $t_{i-1}$ comprises instruction to cease transmitting to an intermediate highway pair a tone applied thereto at the time $t_i$, the phase decoder 346 marks, at the time $t_{i-1}$ at which the address of such intermediate highway pair appears on connection $326_1$, the gate 3528, which opens and applies a signal during the four consecutive times $\theta_5$ to $\theta_8$ to the gate 3527 which is in turn opened via the wire $352_5$ at the latest by the time $t_{i-1}\theta_4$.

Referring to FIG. 5, it will be seen that the group of elements 345–349 for processing the register words comprises:

A phase register 345 supplied by the direct-output connection $325_1$ of the read-out circuit of the data section of the operations store 32 and connected by decoder 346 to the programmer 340, to the modem set address register 342, to the tone control circuit 35 and to the register group 349;

A register 347 for registering the number of digits transmitted or received, such register also being supplied via the connection $325_1$ and being connected to the programmer 340 via a decoder 348, and A group of complementary instruction registers 349 which is supplied via connection $325_1$ and via the inverted-output connection $325_2$ of the data read-out circuit 325 and which is connected to the phase decoder 346 and to the programmer 340.

As will also be apparent, connection $325_1$ is also connected to programmer 340.

Figure 8:
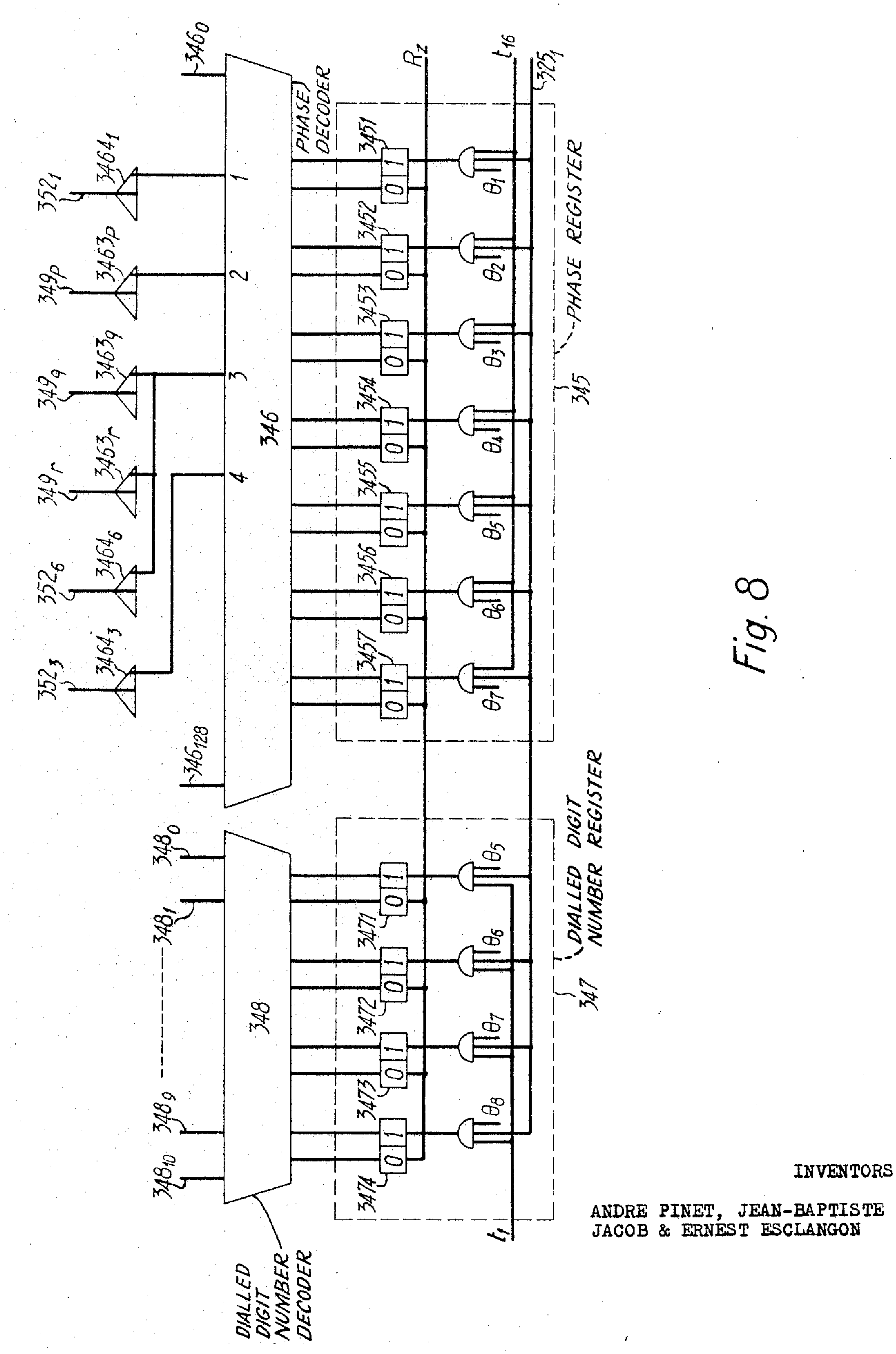
FIGS. 8 and 9 show a second part and a third part, respectively, of the logic network shown in FIG. 5.
Figure 9:
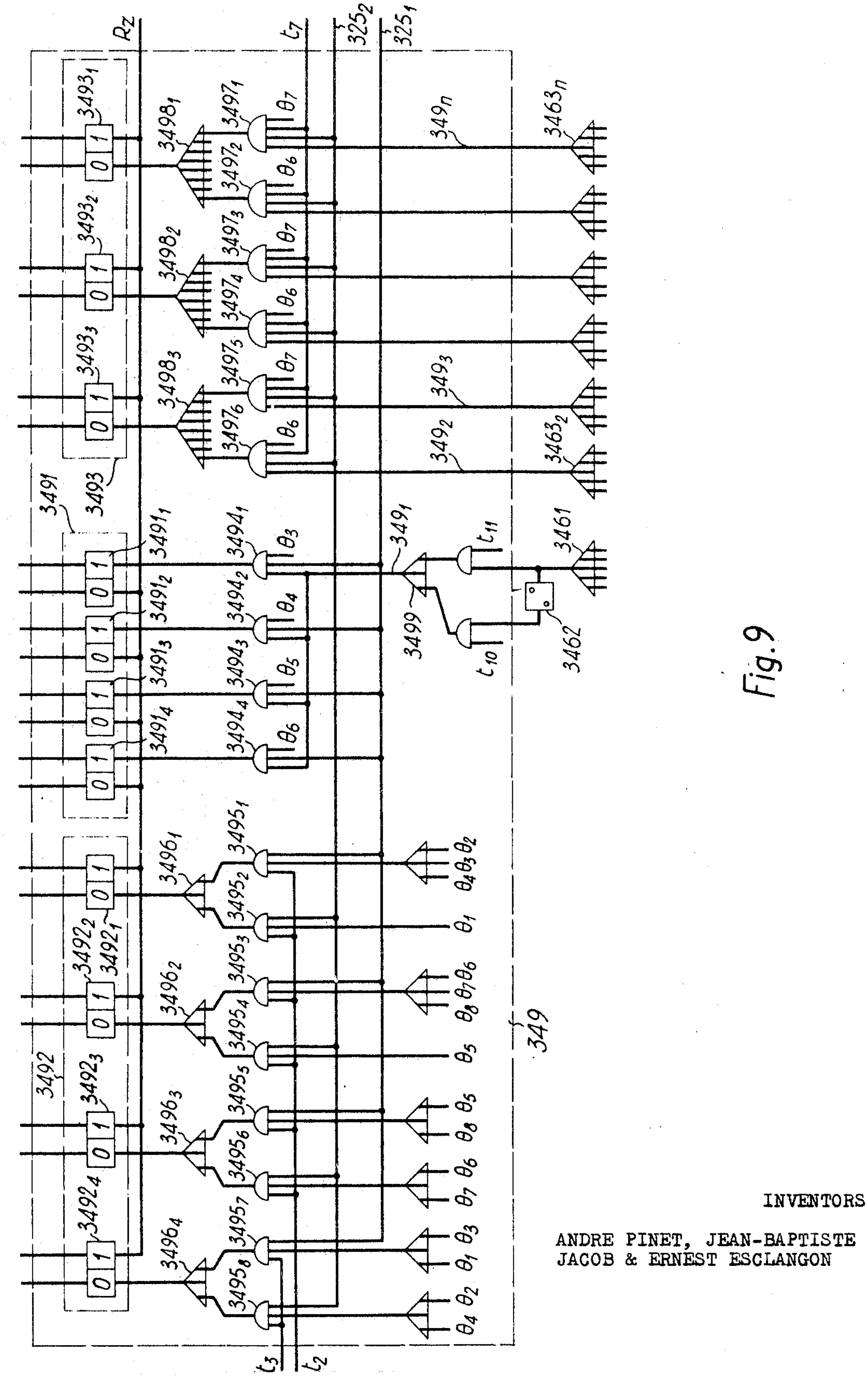

The circuits 345 to 348 are shown in greater detail in FIG. 8 and the circuit 349 is shown in greater detail in FIG. 9.

Phase register 345 comprises seven bistables 3451 to 3457 whose 1 inputs are controlled by and-gates having three inputs which respectively open at the times $t_{16}\theta_1$ to $\theta_7$ and each having one input connected to the connection $325_1$, on which a signal appears each time that a 1 is read in the data operations store 32. The zero-resetting inputs of the bistables 3451 to 3457 are connected to the general resetting connection Rz. The phase decoder 346 has fourteen inputs connected to the zero and 1 outputs of the bistables 3451 to 3457, respectively, and therefore 128 outputs, so that 128 different phases can be distinguished in the programming of the operation of the multiregister 3. Consequently, with effect from the time $t_{16}\theta_8$ the operative output of the decoder 346 corresponds to the phase of the register word being processed until the termination of such processing—i.e., until the time $\overline{\alpha t_{14}\theta_4}$. The outputs of phase decoder 346 are connected, either individually or via or-gates grouping the phases in which a single operation is to be performed, to the programmer 340 and to the circuits 342, 349, 35 as hereinbefore described.

With regard to the modem set address register 342, the phase decoder 346 outputs corresponding to phases during which the subscriber's line to be tested is the called subscriber's line are connected to the inputs of the or-gate 3461 whose output is the connection $342_2$ controlling the gate 3422 which is open during the time interval $t_i\theta_3$ to $t_{i+1}\theta_3$, as described with reference to FIG. 6. In the absence of signal at the output of gate 3461, a signal is delivered by inverter 3462 to connection $342_1$ which controls the gate 3421, the same opening at the latest for the time interval $t_{i-1}\theta_4$ to $t_i\theta_4$.

The or-gate 3461 and some or-gates $3463_2$ to $3463_n$ which also group phases during which a desired operation is to be performed, control the register group 349, as will be seen hereinafter, and the connections $352_1$ to $352_4$ and $352_6$ via which tone instructions are written into and erased from the circuit 35 are output connections of or-gates $3464_1$ to $3464_4$ and $3464_6$ which group the respective phases during which the various tones are to be transmitted or suppressed.

The register 347 comprises four bistables 3471 to 3474 whose 1 inputs are controlled by and-gates which open at the times $t_1\theta_5$ to $\theta_8$ and which each have one input connected to connection $325_1$. The zero-resetting inputs of bistables 3471 to 3474 are connected to the general resetting connection Rz. Since, as has been seen in the description of the structure of the register words, the time $t_1$ is reserved for the indication of the number of digits previously transmitted or received, as expressed by the four binary elements $t_1\theta_5$ to $\theta_8$, this indication is stored by the register 347 and indicated by the decoder 348 during the time interval $t_1\theta_8$ to $\overline{\alpha t_{14}\theta_4}$. The decoder 348 has eleven outputs $348_0$ to $348_{10}$ which are connected to programmer 340.

The group of complementary instructions registers comprises three registers; the first, 3491, comprises four bistables $3491_1$ to $3491_4$ and enables the state of the subscriber's line to be studied; the second, 3492, comprises four bistables $3492_1$ to $3492_4$ and can determine, on the basis of the first digits dialled by a calling subscriber, the total number of digits to be received; and the third comprises three bistables $3493_1$ to $3493_3$ and can store three different timings.

The 4 bistables $3491_1$ to $3491_4$ have their 1 inputs controlled by four and-gates $3494_1$ to $3494_4$ respectively, each having a first input connected to connection $325_1$, a second input connected to the output of an or-gate 3499 via a connection $349_1$, and a third input receiving an opening pulse at the times $\theta_3$ to $\theta_6$ respectively. As has been seen, these times are allotted in a register word to the most recent results of tests of the state of the calling subscriber's loop during the time $t_{10}$ and of testing of the called subscriber's loop during the time $t_{11}$, the last detected loop state appearing at the time $\theta_3$. Or-gate 3499 has two inputs connected to the output of or-gate 3461 via an and-gate, opening at the time $t_{10}$, in series with the inverter 3462, and via an and-gate which opens at the time $t_{11}$. Consequently, gates $3494_1$ to $3494_4$ open at the times $t_{10}\theta_3$ to $\theta_6$ respectively when the line to be tested is the calling subscriber's line, and at the times $t_{11}\theta_3$ to $\theta_6$ when the line to be tested is the called subscriber's line. The zero-resetting inputs of the four bistables $3491_1$ to $3491_4$ are connected to the general resetting connection Rz.

The 4 bistables $3492_1$ to $3492_4$, whose 1 inputs are connected to the general resetting connection Rz, have their zero-resetting inputs respectively connected to the output of or-gates $3496_1$ to $3496_4$ each having two inputs controlled respectively by two and-gates $3495_1$ and $3495_2$ to $3495_7$ and $3495_8$. This system provides partial decoding of the number of digits which a complete dialling should include on the basis of the first three digits dialled, using the following conventions:

(a) If the first digit dialled is other than 1 or if the first three digits dialled are 1, 1, 0, the dialled number should comprise six digits;

(b) If the first digit dialled is 1 and the second digit dialled is 6, the dialling must comprise ten digits;

(c) If the first digit dialled is 1 and the second digit dialled is other than 1 and 6, the dialled number comprises two digits, and (d) If the first two digits dialled are 1 and the third digit other than 0, the dialled number comprises three digits.

The bistables $3492_1$ to $3492_4$ are respectively zero-reset if the first digit is not 1, if the second digit is not 1, if the second digit is not 6 and if the third digit is not 0.

The logic conditions for zero-resetting of the bistables $3492_1$ to $3492_4$ are shown in FIG. 9 in dependence upon the position of the first three digits dialled in the register word as hereinbefore described—i.e., the four bits $t_2\theta_1$ to $\theta_4$ for the first digit, the four bits $t_2\theta_5$ to $\theta_8$ for the second digit, and the four bits $t_3\theta_1$ to $\theta_4$ for the third digit. The gates $3495_1$ to $3495_6$ associated with the bistables $3492_1$ to $3492_3$ concerning the first two digits of the dialling each have one input via which their opening is allowed at the time $t_2$, and the gates $3495_7$, $3495_8$ associated with the bistable $3492_4$ concerning the third digit of the dialling can open only at the time $t_3$. Gate $3495_1$ has one input connected to connection $325_1$ which operative at the times when the register word comprises one bit equal to 1 and opens at the times $t_2\theta_2$, $t_2\theta_3$, $t_2\theta_4$, and the gate $3495_2$ has one input connected to connection $325_2$ which is operative at the times when the register word comprises a bit equal to zero and is opened at the time $t_2\theta_1$. Bistable $3492_1$ is therefore brought to the 0 state either via gate $3495_2$, if the bit $t_2\theta_1$ is zero, or via gate $3495_1$ if one of the bits $t_2\theta_2$ to $\theta_4$ is 1. It therefore stays in the 1 state only if the binary number which expresses the first digit of dialling is 0001. The gates $3495_3$, $3495_4$ are connected to the connections $325_1$, $325_2$ respectively and open at the times $t_2\theta_6$, $\theta_7$, $\theta_8$ and $t_2\theta_5$, so that bistable $3492_2$ stays in the 1 state only if the second digit dialled is 1. The gates $3495_5$, $3495_6$ which serve to bring the bistable $3492_3$ into the zero state if the second digit dialled is other than 6—i.e., if the latter digit is expressed by a binary number other than 0110—are treated as follows: gate $3495_5$ is connected to connection $325_1$ and opens at the times $t_2\theta_5$ and $t_2\theta_8$, and gate $3495_6$ is connected to connection $325_2$ and opened at the times $t_2\theta_6$ and $t_2\theta_7$. Since the decimal digit 0 is expressed by the binary number 1010 corresponding to 10, what happens to the gates $3495_7$, $3495_8$ which serve to bring the bistable $3492_4$ into 0 state if the third digit dialled is other than zero is that gate $3495_7$ is connected to connection $325_1$ and opened at the times $t_3\theta_1$ and $t_3\theta_3$, and gate $3495_8$ is connected to connection $325_2$ and opened at the times $t_3\theta_2$ and $t_3\theta_4$.

Consequently, when the bistables $3492_1$, $3492_2$, $3492_3$ are respectively in the 1 state (first digit equal to 1), in the zero state (second digit other than 1) and in the zero state (second digit other than 6), the number of digits to be received is two. When the bistables $3492_1$, $3492_2$, $3492_4$ are respectively in the 1 state (first digit equal to 1), in the 1 state (second digit equal to 1) and in the zero state (third digit other than 0), the number of digits to be received is 3. When bistable $3492_1$ is in the zero state (first digit other than 1) and when the bistables $3492_1$, $3492_2$ and $3492_4$ are respectively in the 1 state (first digit equal to 1), in the 1 state (second digit equal to 1) and in the zero state (third digit equal to 0), the number of digits to be received is six. When the bistables $3492_1$, $3492_3$ are respectively in the 1 state (first digit equal to 1) and in the 1 state (second digit equal to 6), the number of digits to be received is 10.

The outputs of bistables $3492_1$ to $3492_4$ are connected to the programmer 340 which compares the number of digits received with the number of digits to be received and, when these numbers are equal to one another, derives and end-of-dialling signal.

The bistables $3493_1$, $3493_2$, $3493_3$ are to process the time data which fill the slots $t_7$, $t_8$, $t_9$ and the times $t_{10}\theta_1$, $t_{10}\theta_2$ of the register words. Each such bistable can store a given delay. Their 1 inputs are connected to the general resetting connection Rz and their zero-resetting inputs are controlled by similar or-gates $3498_1$, $3498_2$, $3498_3$ respectively which group the time and phase conditions in which the read-out signals of the operations store have access to the bistables. Each or-gate input, for instance, of or-gate $3498_1$, is connected to the output of an and-gate 3497 having four inputs, the first of which is connected to connections $325_2$ and the others of which are opening inputs which become operative respectively at times $t_7\theta_1$ and $t_{10}\theta_2$ and in phase conditions determined by the phase decoder 346, the various and-gates 3497 which are associated with any single or-gate 3498 opening in different phase or time conditions. In order not to overload the drawing unnecessarily, all that is shown for each of the gates $3498_1$ to $3498_3$ is two gates 3497 individually connected to output connections, as $349_2$ to $349_n$, of the or-gates $3463_2$ to $3463_n$ grouping the phase decoder outputs corresponding to the phases during which each of the gates 3497 must open, for instance, at times such as $t_7\theta_6$ and $\theta_7$.

All the bits associated with timings are divided into two or more groups within which the delays or waiting times to be observed are expressed by a binary number based on units of 6.4 milliseconds. These delays are readjusted on a power of 2 or on the sum of a limited number of powers of 2 of these counting units so that their becoming due is indicated by the presence of a carry-over in one or more bits of predetermined weight. To be able to discover the appearance of the last of the carry-overs expected for a desired delay, the condition for a timing bistable not to be reset to zero is that all the bits having access to its zero-resetting input are equal to 1. This is why all the gates giving access to the latter bistables are connected to connection $325_2$, which is operative when the bit read-out is 0.

The final timing bit $t_{10}\theta_2$ is used as a blocking element to ensure that carry-overs cannot spread to the following bits of the register word, and to this end it is zero-reset at each processing.

Figure 10:
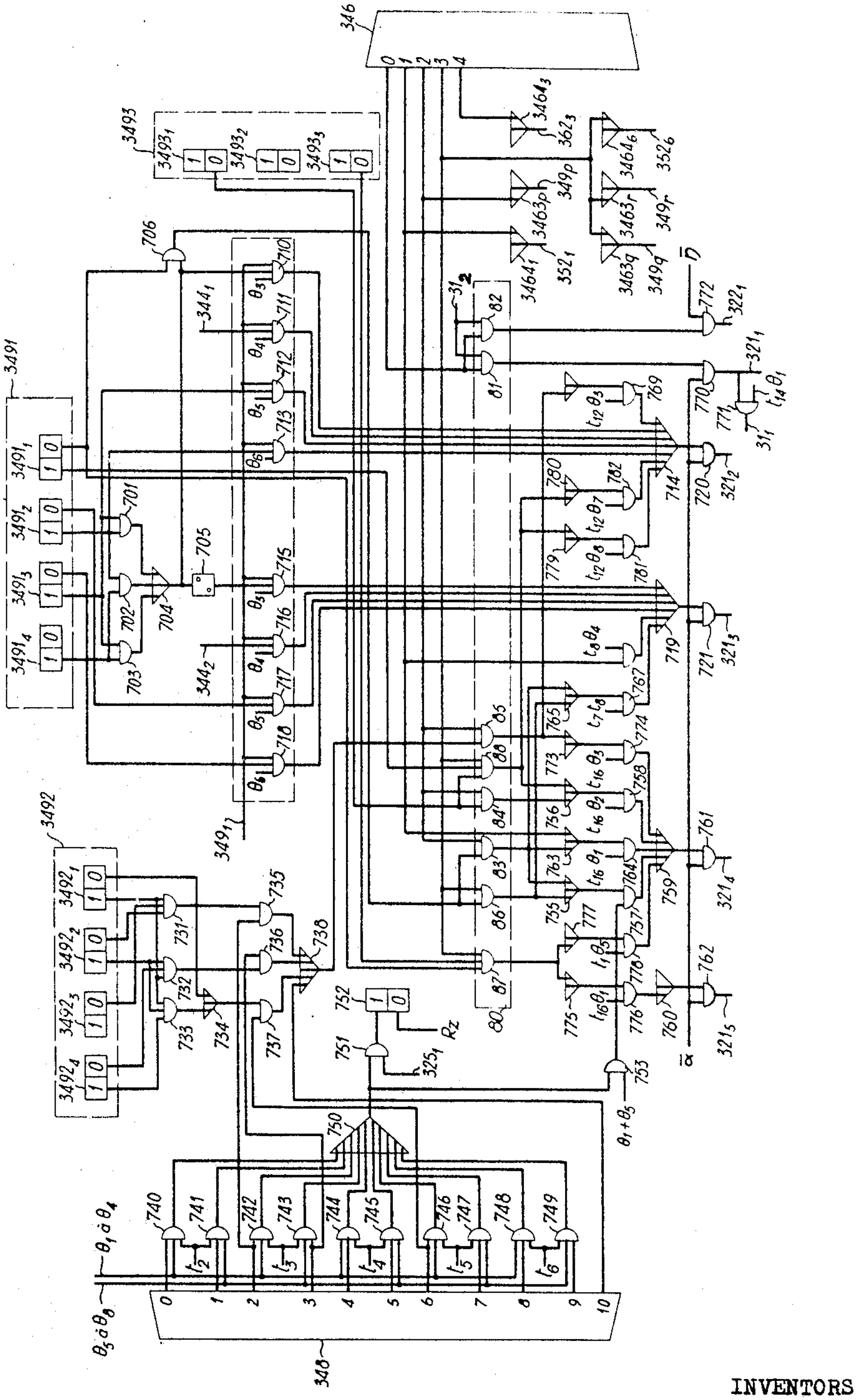
FIG. 10 shows the programmer which forms the fourth part of the logic network shown in FIG. 5.

FIG. 10 is a diagrammatic and partial view of the programmer 340 with some of the connections to the elements hereinabove described, such connections being taken as an example to show the principle of its operation.

The programmer 340 comprises an and-gate group 80, only a reduced number 81 to 88 of which are shown just as an example, and circuits for connecting these gates to the phase decoder 346, the register 3491 defining the state of the subscriber's loop, the register 3492 indicating the number of dialling digits to be received, the group or timing bistables 3493, the decoder 348 associated with the number of digits transmitted or received, and the operations store 32 and the bistables 317, 337 of the input store 31 and output store 33.

Of the bistables $3491_1$ to $3491_4$, the former indicates the state of the subscriber's loop determined during the previous processing of the register word, and the other three indicate the results of the three immediately previous tests. These are used to determine the most recent state of the loop, possible interfering signals being eliminated by a majority circuit comprising three and-gates 701 to 703 which each have two inputs and whose outputs are connected to the three inputs of an or-gate 704. The inputs of gates 701 to 703 are connected to the 1 outputs of the bistables $3491_2$ to $3491_4$ so that the two inputs of each of them receive one of the pair combinations of the three signals stored. Consequently, if at least two of the bistables are in the 1 state, gate 704 delivers a signal denoting that the subscriber's loop is open. The subscriber's loop state thus calculated is compared with the previously calculated state stored in bistable $3491_1$, through the agency of an and-gate 706 whose second input is connected to the 0 output of bistable $3491_1$. When a signal appears at the output of gate 706 it denotes an opening of the subscriber's loop.

The bistables $3491_2$ to $3491_4$ also control, together with bistable 3444 of test control circuit 344, the storage of data on the subscriber's loop state at appropriate places in the register word through the agency of two and-gate sets 710 to 713 and 715 to 718 and of two or-gates 714, 719 which respectively group all the conditions of write-in of the digit 1 and digit 0, respectively, into the input bistable 3210 of the data operations store 321 and have their output connected the first to the write-in connection $321_2$, via an and-gate 720 which opens at the time $\alpha$, and the second to erase connection $321_3$, via an and-gate 721 which also opens at the time $\alpha$. All the gates 710 to 713 and 715 to 718 have an opening input connected to the connection $349_1$ which is made operative by the phase decoder 346 at the time $t_{10}$ when the tested line is the calling subscriber's line, and at the time $t_{11}$ when the tested line is the called subscriber's line. The gates 710–713 and 715–718 receive opening pulses at the times $\theta_3$ to $\theta_6$ respectively. The main inputs of the gates 710 and 715 are connected to the output of gate 704, the first directly and the second via an inverter 705. The main inputs of gates 711, 716 are connected via connections $344_1$, $344_2$ respectively to the 1 and 0 outputs of the bistable 3444. The gates 712, 717 are respectively connected to the 1 and 0 outputs of the bistable $3491_2$, and the gates 713, 718 are connected to the 1 and 0 outputs of the bistable $3491_3$. Consequently, during the time $t_{10}$—if the tested line is a calling line—and during the time $t_{11}$—if the tested line is a called line—the most recent loop state is written in by the gate 710 or gate 715 at the time $\theta_3$, the most recent test result is written in by the gate 711 or 716 at the time $\theta_4$, and the results of the two previous tests are written in by the gates 712, 713, or 714, 715 at the times $\theta_5$ and $\theta_6$.

The data contained in register 3492 are decoded via a set of three and-gates 731, 732, 733, each of which has three inputs, and one or-gate 734. Each of gates 731–733 has one input connected to the 1 output of bistable $\mathbf{3492_1}$, the latter output being operative when the first digit of the dialling is 1. The gate 731 has its other two inputs connected to the 0 outputs of the bistables $\mathbf{3492_2}$, $\mathbf{3493_3}$ respectively, the latter outputs being operative when the second digit of the dialling is other than 1 and other than 6. Gate 731 therefore delivers a signal when the number of digits to be received is two.

Gate 732 has its other two inputs connected to the 1 output of bistable $\mathbf{3492_2}$ and to the 0 output of bistable $\mathbf{3492_4}$, respectively, such outputs being operative when the second digit of the dialling is 1 and the third digit is other than 0. Gate 732 therefore delivers a signal when the number of digits to be received is three.

The gate 733 has its other two inputs connected to the 1 outputs of bistables $\mathbf{3492_2}$, $\mathbf{3492_4}$, respectively, and therefore delivers a signal when the first three digits of the dialling are 1, 1 and 0. The output of gate 733 is connected to an input of or-gate 734 whose second input is connected to the 0 output of bistable $\mathbf{3492_1}$ and which therefore delivers a signal in the two cases in which the number of digits to be received is six. If none of gates 731, 732, 734 delivers a signal, the number of digits to be received is 10.

The number of digits to be received is compared with the number of digits actually received through the agency of a set of three and-gates 735–737 each having two inputs—one connected to the output of gates 731, 732, 734 and the second connected to outputs 2, 3, 6 of the device 348 for decoding the number of digits received or retransmitted. The outputs of gates 735–737 are connected to three inputs of an or-gate 738 having four inputs, the fourth input being connected to output 10 of decoder 348 and therefore delivering a signal denoting completion of dialling.

Outputs 0 to 9 of decoder 348 are respectively connected to one input of and-gates 740–749 which also each have two opening inputs via which they are open consecutively, the first for the time $t_2\theta_1$ to $\theta_4$, the second for the time $t_2\theta_5$ to $\theta_8$, the third for the time $t_3\theta_1$ to $\theta_4$, and so on, so that each of them delivers a signal while the four bits which represent one of the ten dialling digits appear at the output of read-out circuit 325 of the data operations store. The outputs of gates 740 to 749 are connected to the ten inputs of an or-gate 750 having its output connected to one input of an and-gate 751 whose second input is connected to the connection $\mathbf{325_1}$ and whose output controls the bringing to the 1 state of a bistable 752, the output of or-gate 750 also being connected to one input of an and-gate 753 which is opened at the times $\theta_1$ and $\theta_5$. The zero-resetting input of bistable 752 is connected to the general resetting connection Rz.

The various actions of the programmer 340 are produced by the signals delivered by the gates 80, each of which receives at one of its inputs the signal delivered at the output of decoder 346 corresponding to the phase during which a given action is required to be performed, the gates 80 each receiving at their other inputs the signals indicating the results of the various tests which serve to control this action and which can come from the termination-of-dialling gate 738, from the initiation-of-loop-opening gate 706, from the dialling retransmission bistable 752 and from the timing bistables 3493 and from the transfer store bistables 317, 337.

The signals from the gates 80 can be used either directly for some external action, such as actuating the bistables 317 or 337 via the connections $\mathbf{31_1}$ or $\mathbf{33_1}$ or for initiating opening of the write-in gates of the operations store 32 via the connections $\mathbf{321_1}$, $\mathbf{322_1}$, or else they can be used to modify the register word during its rewrite-in by gates, as 755, 763, giving access to the addition connection $\mathbf{321_4}$, and by a gate 775 giving access to the subtraction connection $\mathbf{321_5}$, or by gates, as 780, 765, giving access to the write-in connection $\mathbf{321_2}$ and erase connection $\mathbf{321_3}$ via and-gates 782, 767, which open at the required times, and via gates 714, 719. The outputs of the programmer to the data operations store and the transfer stores 31, 33 are supervised by and-gates which are in the closed state for the duration of the signal $\alpha$ and in the conductive state in the presence of the signal $\overline{\alpha}$. Of such a kind are the gates 720, 721, controlling the write-in connection $\mathbf{321_2}$ and erase connection $\mathbf{321_3}$ respectively, the gates 761, 762, controlling the addition connection $\mathbf{321_4}$ and subtraction connection $\mathbf{321_5}$ respectively, and the gate 770 controlling the connection $\mathbf{321_1}$ for opening the write-in gates 3191, 3192 of the data operations store and, via an and-gate 771 triggering at the time $t_{14}\theta_1$, the connection $\mathbf{31_1}$ for opening the bistable 317 of the input store 31. The programmer also controls the gates 3181, 3182 of the address operations store via gate 772 and lead 322.

Examples of some of the functions performed by the programmer will be given during the following description of the general operation of the multiregister 3.

Three periods characterize each action of the multiregister in building-up a call: seizing a register word, i.e. temporarily allotting a register word to a call; processing the register word, i.e. effecting all the operations which can be performed during each passage of this register word through the logic network; and release of a register word, i.e. transferring to the central computer 4 information contained in the register word and erasing all the bits stored in the register word which thus becomes available for reseizure.

When a storing word of the operations store 32 is available, all its bits are 0, more particularly the elements $t_{16}\theta_1$ to $\theta_7$, the passage of which into output bistable 3257 of read-out device 325 in the presence of signal $\alpha$ does not produce any signal on connection $\mathbf{325_1}$, so that the seven bistables of phase register 345 stay at 0 and the operative output of phase decoder 346 is its 0 output. The same is directly connected to the first inputs of gates 81, 82 forming parts of gate set 80, the second inputs thereof being connected via connection $\mathbf{31_2}$ to the zero output of bistable 317. The output of gate 81 is connected via gate 770 which opens during the time $\overline{\alpha}$, to the opening connection of the write-in gates 3191, 3192 of the data operations store. When, once the input transfer store 31 has been filled by the central computer 4 and the same has brought the bistable 317 to the zero state, the signal $\overline{\alpha}$ opens the gate 770 at the time $t_{15}\theta_6$, the data contained in store 31 are introduced into the data operations store, whereafter bistable 317 is returnd to the 1 state via the connection $\mathbf{31_1}$ which is connected to the output of gate 770 via a gate 771 which opens at the time $t_{14}\theta_1$. The output of gate 82 is connected via gate 772, which the signal $\overline{\eta}$ opens twelve microseconds after the gate 770, to connection $\mathbf{322_1}$ for opening the write-in gates 3181, 3182 of the addresses operation store. The identification number of the intermediate highway pair chosen by the computer for effecting the call, whose supervision has been entrusted to the multiregister 3, between two modem sets at the time $t_i$ is therefore stored in the operations store during the time $t_{i-1}\theta_2$ to $\theta_4$ and the address of the sets is stored during the time $t_{i-1}\theta_5$ to $\theta_8$, for the calling subscriber's set, and during the time $t_i\theta_5$ to $\theta_8$, for the called subscriber's set.

The operations store register word which the central computer 4 has thus filled comprises more particularly during the time $t_{16}\theta_1$ to $\theta_7$ the number of the phase in which is the call to be supervised. If such call is in its initial stage, when the register word re-occurs two sampling periods—i.e., 6.4 ms.—later at the output of the read-out device 325 in concordance with the signal $\alpha$, the decoder 346 applies from the time $t_{16}\theta_7$, via its 1 output, the or-gate $\mathbf{3464_1}$ and the connection $\mathbf{352_1}$, a signal to the gate 3521 which opens at each time $\theta_5$. At time $t_{1-1}\theta_4$ the register 350 designates the intermediate highway pair registered in the address-register word, and bistable 3411 opens gate 3526, so that the instruction to transmit dialling tone is written in to that of the circulating stores $354_1$ to $354_7$ which corresponds to the designated intermediate highway pair. Dialling tone is therefore applied to such intermediate highway pair at each of the time slots $t_i$ allotted to the proposed call. The 1 output of decoder 346 is also connected to the 1 input of bistable 3214 via the addition order connection $321_4$ and via gates determining the phase jump necessary to change over from the initial phase to the initiation of dialling pulses waiting phase. For instance, the 1 output of decoder 346 can be connected to one input of an and-gate 764, opening at the time $t_{16}\theta_1$ via or-gate 763 and and-gate 83, the latter pertaining to the set of gates 80, a signal of which is required to produce the changeover to the phase of next highest number. The output of gate 764 is connected to the addition connection $321_4$ via an or-gate 759 grouping all the accesses to the latter connection and via the and-gate 761, which opens at the time of the signal $\bar{\alpha}$. Consequently, when, upon leaving the auxiliary rewrite-in store 327, 127 $\mu$s. after its read-out the bit of lowest weight of the seven bits which re-present the number of the phase in the register word is registered in bistable 3210, the digit 1 is registered in bistable 3213, so that their sum is rewritten into store 323 and at the next read-out the phase which is read-out is phase 2.

Since any number can be broken down into a sum of powers of two, a phase jump of any amplitude within the limit of the 128 phases provided can clearly be made in a similar manner by the addition or subtraction of one unit to the binary digits of desired weight.

In the phase 2 awaiting for the initiation of pulsing, the gates 83–85 are open, and, through or-gate $3464_p$ and lead $349_p$, the gate $3497_p$ is open giving access during the time $t_8\ \theta_4$ to the 1 input of one of the three timing bistables, for instance, the bistable $3493_1$, whose zero output is connected to the second input of gate 84. If no loop interruption has been indicated during the consecutive processings of the register word during the time of $2^{12}\times6.4$ ms.—i.e., approximately 13 seconds—thus determined, gate 84 delivers a signal which is applied to addition connection $321_4$ via an or-gate 756, gates 759, 761 and an and-gate 758 which opens at the required time, for instance $t_{16}\ \theta_2$, to produce a phase jump, for instance, of two phases, bringing matters to phase 4 during which the instruction to transmit the busy tone to the calling subscriber, to tell him that his call is rejected, is applied to circuit 352 via gate $3464_3$ and connection $352_3$.

When a loop interruption occurs before the end of this time, the gate 83, whose second input is connected to the output of gate 706, which then delivers a signal, transmits the same to three and-gates 757, 764, 767 via three or-gates 755, 763, 765 respectively. The second input of gate 757 is connected to the output of gate 753. Since the gate 753 is connected to the output of gate 750, which delivers a signal during the four consecutive times reserved for read-out of the expected dialling digit, and since it opens at the times $\theta_1$ and $\theta_5$, said gate 753 indicates the place of the first bit of the expected digit by a signal which is applied via gates 759 and 761 to the addition connection $321_4$, so that 1 unit is added to the binary number representing the digit actually being dialled. Gate 764 opens at the time $t_{16}\ \theta_1$ and its output is also connected to the addition connection $321_4$ via gates 759, 761, so that 1 unit is added to the number of the phase. Gate 767 opens at times $t_7$, $t_8$ and its output is connected to the connection $321_3$ for erasing or writing-in a 0 via the gates 719, 721, so that the time counting for opening the gate 84 is reset to 0 at each fresh pulse.

Gate 85 has its second input connected to the output of gate 738 which delivers an end-of-dialling signal, as hereinbefore seen. The output of gate 85 is connected to the write-in connection $321_2$, via gates 714, 720 and an and-gate 769 which opens at the time $t_{12}\ \theta_3$, and to the addition connection $321_4$ via an or-gate 773, an and-gate 774 which opens at the time $t_{16}\ \theta_3$, and the gates 759, 761. The end-of-dialling signal therefore initiates write-in of the end-of-dialling code for the use of the central computer 4 and a changeover to a fresh phase, for instance, phase 5, corresponding to transfer of the register word into the output store 33.

The changeover to phase 3 resulting from the gates 83, 764 being opened by the start of a dialling pulse initiates an instruction for cessation of dialling tone via the gate $3464_6$ and the connection $352_6$ and for opening the gates 86, 87, 88 and gates $3497_q$, $3497_r$ which respectively give access at the time $t_7\ \theta_6$ to the timing bistable $3493_3$, the 0 output thereof being connected to one of the inputs of the gate 87 and, during the time $t_7\ \theta_7$, to the timing bistable $3493_1$ whose 0 output is connected, as already seen, to one input of gate 84 and to one input of gate 88.

The output of gate 86, whose second input is connected to the output of gate 706, orders at each pulse initiation the addition +1 to the registration of dialling signals by the gates 755, 757 and the erasure of the delay at the times $t_7$, $t_8$, like the gate 83 in phase 2.

The gate 87, whose second input is connected to the zero output of the timing or delay bistable $3493_3$, which output is operative when the delay reaches 200 ms., the third input being connected to the 0 output of bistable $3491_1$, which output is operative when the subscriber's loop is closed, delivers an end-of-digit signal when these conditions exist. The latter signal is applied to the subtraction connection $321_5$, via or-gate 775, and-gate 776, which opens at the time $t_{16}\theta_1$, and gates 760, 762, to produce a return to phase 2, and to the addition connection $321_4$, via or-gate 777, and-gate 778, which opens at the time $t_1\theta_5$, and gates 759, 761, to produce the addition of 1 unit to the number of digits received.

The start of the first pulse of the next digit causes a change-over from phase 2 to phase 3, and the termination of each digit causes a change back from phase 3 to phase 2, until the end-of-dialling signal appears at the output of gate 738, the latter signal being applied to the gate 85 as already seen.

Gate 88, whose first input is connected to the 0 output of bistable $3493_1$, which output is operative when the delay reaches 400 ms., the second input being connected to the 1 output of bistable $3491_1$, which output is operative when the subscriber's loop is open, delivers, when both these conditions exist, a signal indicating that the caller has hung up. The latter signal causes a change-over to phase 5, corresponding to transfer of the register word into the output store 33 via gates 756, 758, 759, 761 and the addition connection $321_4$, and the writing-in into the register word of the disconnection code of the caller via or-gates 779, 780, and-gates 781, 782, which open at times $t_{12}\theta_7$ and $t_{12}\theta_8$ respectively, gates 714, 720 and the connection $321_2$ via which the 1 digit is written in.

These few examples of the functions performed by the programmer 340 relate to only a small proportion of the 128 phases which can be designated by the seven bits $t_{16}\theta_1$ to $t_{16}\theta_7$ of the storing word, but suffice to show clearly the operating procedure of the multiregister 3, the other functions being performed similarly and being deducible from the functions hereinbefore described. For instance, for the transmission of dialling signals over a connecting circuit to another telephone office, the dialling pulses are transmissions of the ringing tone, whose duration and intervals within a digit and between digits are calibrated by means of the delay bistables 3493; at the start of a digit 1 unit is subtracted from the number of digits to be transmitted instead of being added to such number, as in the reception of dialling, and bistable 752 is used to determine the end of transmission of each digit and the transmission of the final digit of dialling.

What we claim is:

1. In a pulse code modulated time division telephone switching system comprising subscribers' lines carrying analog signals, subscribers' line modem sets adapted for sampling and converting said analog signals into PCM signals, a crosspoint matrix including send-and-receive group highways connected to said modem sets and intermediate highways transmitting time multiplexed signals from the calling subscriber's line modem to the called subscriber's line modem, a switching system including a central computer, a multiregister associated thereto, and means for transferring addresses and data from said computer to said multiregister and vice versa, said central computer comprising means for searching the calling subscribers' lines, means for selecting idle intermediate highways and means for selectively activating the crosspoints of said crosspoint matrix, said multiregister comprising means for detecting the signals in said intermediate highways and deriving therefrom register words, a data circulating store and an address circulating store synchronous with each other, a first and a second write-in circuit and a first and a second read-out circuit inserted in both said data and address circulating stores, an adder-subtracter circuit inserted in said data circulating store, means for connecting said detecting and register word deriving means to said second write-in and second read-out circuits in both said data and circulating stores, and said transferring means comprising an input data transfer circulating store having a write-in circuit connected to the central computer and a read-out circuit connected to the first write-in circuit of the data circulating store, an input address transfer circulating store having a write-in circuit connected to the central computer and a read-out circuit connected to the first write-in circuit of the address circulating store, an output data transfer circulating store having a read-out circuit connected to the central computer and a write-in circuit connected to the first read-out circuit of the data circulating store and an output address transfer circulating store having a read-out circuit connected to the central computer and a write-in circuit connected to the first read-out circuit of the address circulating store.

2. In a pulse code modulated time division telephone switching system comprising subscribers' lines carrying analog signals, subscribers' line modem sets adapted for sampling and converting said analog signals into PCM signals, a crosspoint matrix including send-and-receive group highways connected to said modem sets and intermediate highways transmitting time multiplexed signals from the calling subscriber's line modem to the called subscriber's line modem, a switching system including a central computer, a multiregister associated thereto, and means for transferring addresses and data from said computer to said multiregister and vice versa, said central computer comprising means for searching the calling subscribers' lines, means for selecting idle intermediate highways and means for selectively activating the crosspoints of said crosspoint matrix, said multiregister comprising means for detecting the signals in said intermediate highways and deriving therefrom register words, a data circulating store and an address circulating store synchronous with each other, a first and a second write-in circuit and a first and a second read-out circuit inserted in both said data and address circulating stores, an adder-subtracter circuit inserted in said data circulating store, means for connecting said detecting and data-register word deriving means to said second write-in and second read-out circuits in both said data and circulating stores, an intermediate highway address register, means for transferring into said intermediate highway address register the address of a selected intermediate highway stored in the address circulating store, a generator of tone signals, means controlled by the detecting and deriving means for controlling said tone signal generator and selecting a tone signal, and means for applying said selected tone signals to said selected intermediate highway, and said transferring means comprising an input data transfer circulating store having a write-in circuit connected to the central computer and a read-out circuit connected to the first write-in circuit of the data circulating store, an input address transfer circulating store having a write-in circuit connected to the central computer and a read-out circuit connected to the first write-in circuit of the address circulating store, an output data transfer circulating store having a read-out circuit connected to the central computer and a write-in circuit connected to the first read-out circuit of the data circulating store, and an output address transfer circulating store having a read-out circuit connected to the central computer and a write-in circuit connected to the first read-out circuit of the address circulating store.

3. In a pulse code modulated time division telephone switching system comprising subscribers' lines carrying analog signals, subscribers' line modem sets adapted for sampling and converting said analog signals into PCM signals, a crosspoint matrix including send-and-receive group highways connected to said modem sets and intermediate highways transmitting time multiplexed signals from the calling subscriber's line modem to the called subscriber's line modem, a switching system including a central computer, a multiregister associated thereto, and means for transferring addresses and data from said computer to said multiregister and vice versa, said central computer comprising means for searching the calling subscribers' lines, means for selecting idle intermediate highways and means for selectively activating the crosspoints of said crosspoint matrix, said multiregister comprising means for detecting the signals in said intermediate highways and deriving therefrom register words, a data circulating store and an address circulating store synchronous with each other, a first and a second write-in circuit and a first and a second read-out circuit inserted in both said data and address circulating stores, an adder-subtracter circuit inserted in said data circulating store, means for connecting said detecting and register word deriving means to said second write-in and second read-out circuits in both said data and circulating stores, a register of modem sets of subscribers' lines, means for transferring into said modem set register the address of a selected modem set stored in the address circulating store, means controlled by said modem set register for gating the signals in the intermediate highways originating at a given modem set and detected by the detecting means, and means for controlling by said gated signals the register word deriving means, and said transferring means comprising an input data transfer circulating store having a write-in circuit connected to the central computer and a read-out circuit connected to the first write-in circuit of the data circulating store, an input address transfer circulating store having a write-in circuit connected to the central computer and a read-out circuit connected to the first write-in circuit of the address circulating store, an output data transfer circulating store having a read-out circuit connected to the central computer and a write-in circuit connected to the first read-out circuit of the data circulating store and an output address transfer circulating store having a read-out circuit connected to the central computer and a write-in circuit connected to the first read-out circuit of the address circulating store.

4. In a pulse code modulated time division telephone switching system comprising subscribers' lines carrying analog signals, subscribers' line modem sets adapted for sampling and converting said analog signals into PCM signals, a crosspoint matrix including send-and-receive group highways connected to said modem sets and intermediate highways transmitting time multiplexed signals from the calling subscriber's line modem to the called subscriber's line modem, a switching system including a central computer, a multiregister associated thereto, and means for transferring addresses and data from said computer to said multiregister and vice versa, said central computer comprising means for searching the calling subscribers' lines, means for selecting idle intermediate highways and means for selectively activating the crosspoints of said crosspoint matrix, said multiregister comprising means for detecting the signals in said intermediate highways, deriving therefrom dialled digit signals representing the numbers of called subscribers and storing said dialled digit signals in register words, a data circulating store and an address circulating store synchronous with each other, a first and a second write-in circuit and a first and a second read-out circuit inserted in both said data and address circulating stores, an adder-subtracter circuit inserted in said data circulating store, means for connecting said detecting and data-register word storing means to said second write-in and second read-out circuits in both said data and circulating stores, a register of the dialled digits of the telephone numbers of called subscribers, means for transferring into said telephone number dialled digit register a predetermined partial number of digits of a called subscriber numebr stored in the data circulating store, means for deriving from the value of each digit of said predetermined partial number of digits the total number of digits of the complete called subscriber's number and means for checking the identity of the number of digits of the complete called subscriber's number stored in said data circulating store with said derived number, and said transferring means comprising an input data transfer circulating store having a write-in circuit connected to the central computer and a read-out circuit connected to the first write-in circuit of the data circulating store, an input address transfer circulating store having a write-in circuit connected to the central computer and a read-out circuit connected to the first write-in circuit of the address circulating store, an output data transfer circulating store having a read-out circuit connected to the central computer and a write-in circuit connected to the first read-out circuit of the data circulating store, and an output address transfer circulating store having a read-out circuit connected to the central computer and a write-in circuit connected to the first read-out circuit of the address circulating store.

References Cited

UNITED STATES PATENTS

| | | |
|---|---|---|
| 3,157,744 | 11/1964 | Wright et al. |
| 3,187,099 | 6/1965 | Adelaar et al. |
| 3,221,103 | 11/1965 | Adelaar et al. |

WILLIAM C. COOPER, Primary Examiner

U.S. Cl. X.R.

179—15